& Meador

United States Patent [19]

Maudlin et al.

[11] Patent Number: 5,386,558

[45] Date of Patent: Jan. 31, 1995

[54] METHOD AND APPARATUS FOR EXECUTING CONTROL SYSTEM FUNCTIONS IN A COMPUTER SYSTEM

[75] Inventors: Craig L. Maudlin, Solana Beach; Susan L. Adler-Sherman, Encinitas, both of Calif.

[73] Assignee: Adapsys, Inc., Cardiff, Calif.

[21] Appl. No.: 840,741

[22] Filed: Feb. 24, 1992

[51] Int. Cl.$^6$ .................................... G06F 15/46
[52] U.S. Cl. ........................... 395/600; 395/10; 395/50; 395/904; 364/DIG. 1; 364/275.2; 364/274.2
[58] Field of Search ............... 395/1, 10, 50, 51, 52, 395/60, 63, 64, 912, 904; 364/DIG. 1, DIG. 2

[56] References Cited

U.S. PATENT DOCUMENTS

| | | | |
|---|---|---|---|
| 4,628,435 | 12/1986 | Tashiro et al. | 364/130 |
| 4,754,409 | 6/1988 | Ashford et al. | 395/11 |
| 4,881,178 | 11/1989 | Holland et al. | 395/51 |
| 4,922,432 | 5/1990 | Kobayashi et al. | 364/490 |
| 5,195,029 | 3/1993 | Murai et al. | 364/184 |
| 5,267,346 | 11/1993 | Maruyama et al. | 395/10 |
| 5,293,556 | 3/1994 | Hill et al. | 364/551.01 |
| 5,321,620 | 6/1994 | Tanaka et al. | 364/468 |

Primary Examiner—Thomas G. Black
Assistant Examiner—Maria N. Von Buhr
Attorney, Agent, or Firm—Baker, Maxham, Jester & Meador

[57] ABSTRACT

A control system is implemented by provision of parts which are data structures with identities, properties, and references to other parts, and clusters which are structures of associated parts. Clusters are assembled into meanings, and contexts are built from meanings and logic components. A current behavior expression consisting of a cluster is established and a meaning analysis procedure searches a set of meanings in a current context for correspondence between one or more meanings and the current behavior expression. When correspondence is found, further analysis switches the current behavior expression to a meaning matched in the current context. The process continues, switching context if necessary, until no meaning can be matched to a portion of the current behavior expression. Those portions of the current behavior expression for which no meaning is found represent primitive actions which are executed to carry out a system intention.

13 Claims, 13 Drawing Sheets

Working-Pool and Results-Pool for Message Handling Example

| step | | working-pool | results-pool |
|---|---|---|---|
| 1-9 | pools are initially empty: | empty | empty |
| 10 | result-item created: | | Result=Fail, B-List=105a c-part:empty, m-start:empty |
| 15 | boundary-list copied into working pool: | 105a | |
| 16 | part 105a removed from working-pool: | empty | |
| 18 | new result-item replaces old one: | | Result=Fail, B-List=106 c-part:empty, m-start:empty |
| 19 | boundary-list copied into working-pool: | 106 | |
| 20 | part 106 removed from working-pool: | empty | |
| 44 | new result item replaces old one: | | Result=Match, B-List=empty c-part:106 m-start:104 |
| 47 | new result-item replaced old one: | | Result=Fail, B-List=117 c-part:106 m-start:104 |
| 47 | boundary-list copied into working-pool: | 117 | |
| 48 | part 117 removed from working-pool: | empty | |

FIG. 15

Circumstance-items for Message Handling Example.

step 36:
- Formal-String: "** details"
- Actual-String: 0
- Actual-Part: part 108
- Actual-Context: C1 step 51:
- Formal-String: "*individual"
- Actual-String: "me"
- Actual-Part: 0
- Actual-Context: C2 step 53:
- Formal-String: "** NO"
- Actual-String: 0
- Actual-Part: part 120
- Actual-Context: C2

- Formal-String: "** YES"
- Actual-String: 0
- Actual-Part: part 121
- Actual-Context: C1 step 57:
- Formal-String: "*subject"
- Actual-String: "draft-product-spec"
- Actual-Part: 0
- Actual-Context: C1 step 60:
- Formal-String: "*subject"
- Actual-String: "draft-product-spec"
- Actual-Part: 0
- Actual-Context: C1 step 61
- Formal-String: "** YES"
- Actual-String: 0
- Actual-Part: part 121
- Actual-Context: C1

- Formal-String: "** NO"
- Actual-String: 0
- Actual-Part: part 120
- Actual-Context: C1

- Formal-String: "*item"
- Actual-String: "me"
- Actual-Part: 0
- Actual-Context: C1

*FIG. 16*

METHOD AND APPARATUS FOR EXECUTING CONTROL SYSTEM FUNCTIONS IN A COMPUTER SYSTEM

BACKGROUND OF THE INVENTION

The invention concerns the implementation of a control system function in a machine system.

A conceptual representation of a control system implementation is illustrated in FIG. 1. The control system operates with respect to an environment which is external to a computer system by sensing external circumstances and performing operations on the external environment in response. The control system is implemented in the computer system, which has an internal environment and internal circumstances which can be perceived by a control component embodying the control system's intention. The control component can act upon both internal and external environments. The "sense" and "act" operations, both internal and external, embrace hugely differing types of environments.

A control system functioning within the external environment of a factory, for example, will employ some means to sense pertinent physical properties of the factory process which is subject to control. Such physical properties might be temperature, pressure, fluid level, assembly line rate, color, and so on. The factory control system will have the ability to act on its external environment in ways also dictated by the nature of the process being controlled. Examples of such actions are the provision of electrical signals to affect the operation of electrical circuits such as relays and the provision of textual or graphical information for recognition and understanding by human users. Broadly, these are discernable indications of control system actions on the external environment.

The comprehensive variety of means for implementing a control system includes digital or analog circuitry ("hardware"), the programming of digital systems ("software"), or a combination of hardware and software.

In these days, the interactions between a computer and external users such as humans or electronic complexes are largely predetermined by specific programming. In effect, users can interact with a computer only in ways which are allowed by the software running in the computer. Adaptation to the needs and circumstances of a particular user or a particular external environment requires the building of new versions of old programs.

Many techniques have come into widespread practice to meet the problem of extreme variability in user needs and environments. One response has been a move toward adoption of standards for all aspects of computer systems, both hardware and software. Another response involves modular decomposition of software systems into component parts so that new versions of old programs may be more rapidly constructed by combining a number of new components with a number of old components from previous versions. While the use of these techniques has been significantly beneficial to the practice of software production, the benefit has generally been in the productivity of software programmers. The benefit, therefore, is necessarily limited by the size of the programmer population.

Another important technique which transcends this last limitation involves the construction of programs which permit specific predefined aspects of their behavior to be modified by a user without new programming. This technique does require the software programmer to define, at the time of program creation, the specific aspects which are to be made subject to user re-configuration. This additional effort pays off because it requires far less labor on the part of the programmer than that required to produce a large number of program versions. However, as computer systems become more complex, it is increasingly difficult to anticipate all dimensions in which a particular program may need to be adapted. Thus, despite industry's recognition of the problem and the adoption of a number of strategies aimed at overcoming it, the problem remains and, by some measures, becomes more grave every year.

SUMMARY OF THE INVENTION

The invention has the objective of increasing a user's ability to adapt a control system to more closely satisfy the user's requirements.

The objective is achieved in a preferred embodiment of the invention by construction of a software program which allows a user's functional requirements to be expressed to the program in a manner determined by the user rather than the software programmer. The functional requirements represent the user's expression of a desired behavior of the system. The expression of desired behavior and the system's response take place in a particular input/output form commonly understood by user and system. Using the input form of expression, the user discloses the desired behavior to the system, the system analyzes the desired behavior in a system context which was preconstructed by the user in order to convey the meaning of the behavior expression to the computer system. Consideration of the behavior expression proceeds by a process of meaning analysis which involves searching a set of meanings in the current context for correspondence between one or more of those meanings and the current behavior expression. Whenever such a correspondence is found, further analysis switches the current behavior expression to the meaning matched in the current context. If necessary, the context is switched. The elements of the current behavior expression are recursively searched for lower-level meaning by repeated application of the same process until no meaning can be matched to a portion of the current behavior expression. Those portions of the current behavior expression for which no meaning is found represent primitive actions of the control system which are capable of being executed by the computer system. These primitive actions are executed and the process switches back to meaning analysis and continues until there are no more meaningful portions to be found in the behavior expression.

In addition to allowing user/system interaction to occur in any form of input/output, the invention also provides for user adaptation of both meaning analysis and action execution phases. Resultantly, the user is afforded the ability to construct an expression of desired behavior which: (1) makes use of an input/output form of the user's own choosing, and (2) makes use of terms of expression whose meanings and corresponding actions are also subject to specification by the user.

In a preferred embodiment, the invention is practiced in a computer system which executes a computer program, the computer system including a storage unit, a central processing unit, input means for providing input data to the storage unit and central processing unit, and output means for providing discernable indications of actions performed by the central processing unit. In this context, the invention is a method for implementing a control system, using:

- a plurality of parts, where each part includes a data object and has a first portion identifying the part, a second portion including a series of associated data items, and a third portion for referencing one or more other parts; and
- a plurality of clusters, each cluster including a data structure with a plurality of inter-related parts.

In the method:
at least one cluster is stored;
a plurality of meanings are stored, each meaning including:
  a template having one or more parts; and
  a definition cluster;
a plurality of logic components are stored, each logic component including an invocable procedure which is executable by the central processing unit;
a plurality of contexts are built, each context including an associated set of meanings, an associated set of logic components and means for identifying another context;
a first context is designated as a current context;
a cluster is designated as a current behavior expression;
(a) parts of the behavior expression are compared with templates in the set of meanings associated with the current context;
(b) for each meaning of the set of meanings whose template matches parts of the behavior expression: the definition cluster of the meaning is designated as the current behavior expression; and
a second context identified by the first context is designated as the current context;
(c) steps (a) and (b) are performed until a part in the current behavior expression is found which does not match a part in a meaning template;
a logic component associated with a current context and identified by a data item of the second portion of the part found in step (c) is invoked;
a control system action is performed by executing the logic component; and
a discernable indication of the control system action is provided.

More particularly, in step (c) of the method, steps (a) and (b) are recursively performed until a plurality of primitive action parts in the behavior expression are found which do not match a meaning template, the invoking and performing steps are executed for each part of the plurality of primitive action parts, and the providing step is executed for one or more parts of the plurality of action parts.

BRIEF DESCRIPTION OF THE DRAWINGS

FIG. 15 is a table illustrating the contents of a working pool and results pool in the example.

FIG. 16 is a table illustrating the contents of a current circumstances data structure in the example.

DETAILED DESCRIPTION OF THE PREFERRED EMBODIMENT

Figure 1:
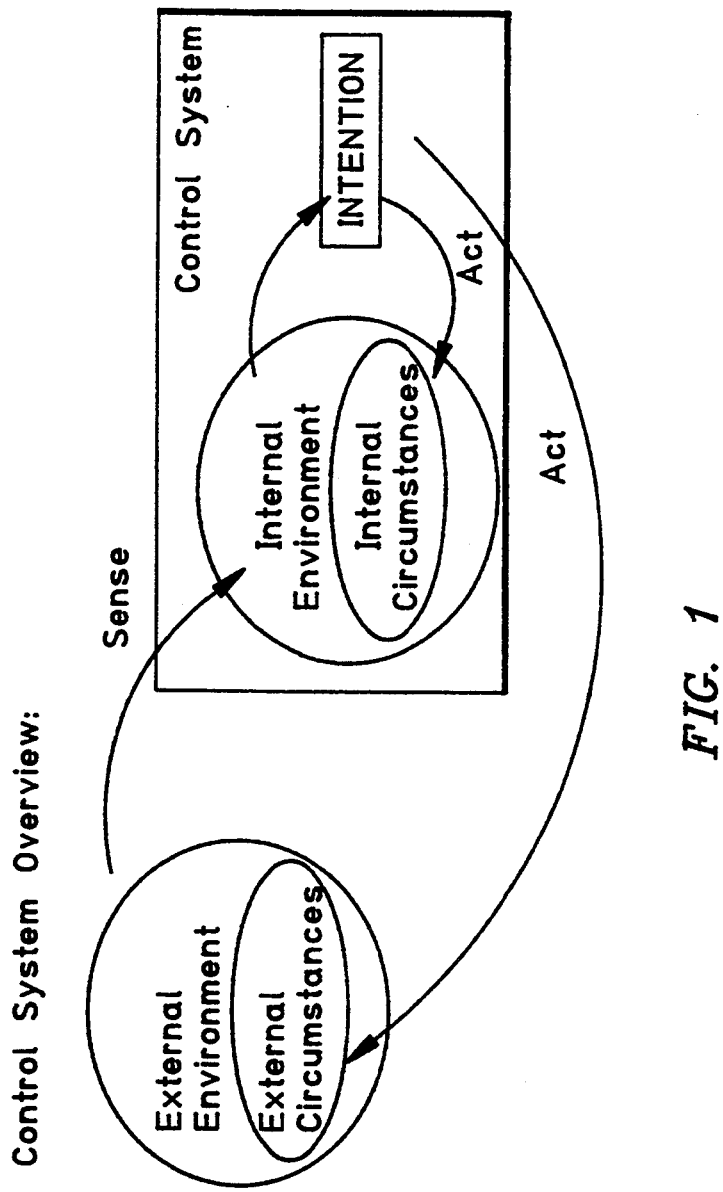
FIG. 1 is a conceptual representation of a control system.
Figure 2:
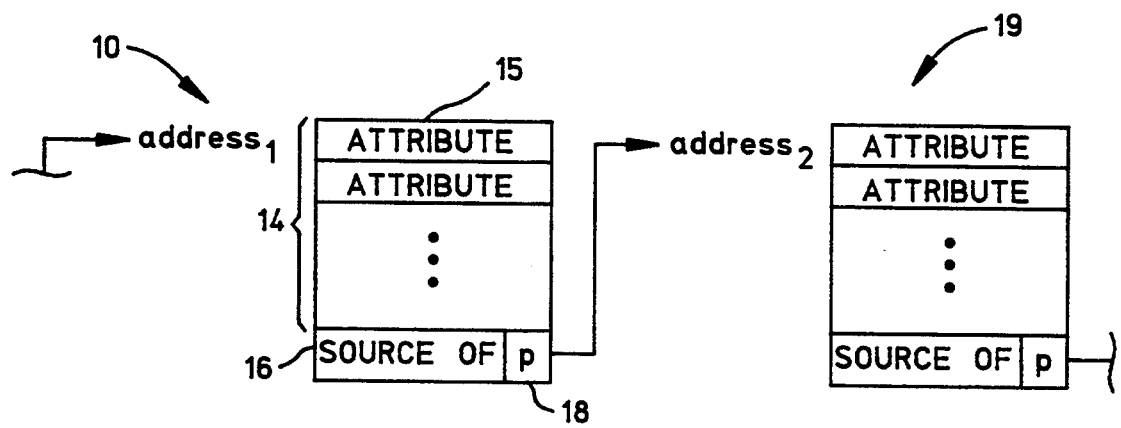
FIG. 2 illustrates data structures which, in the invention, are referred to as "parts".

FIGS. 2–5 illustrate basic components of a control system built and operated according to the invention. FIG. 2 illustrates two interrelated "parts". A part is an element of a control system according to the invention which has a number of characteristics accessible to the invention. A part has: (1) an identity by which it may be referred to by other parts within the system; (2) a set of zero or more data items associated with the part; and (3) zero or more references to other parts in the system. Generally, a part includes a data object which, according to the IBM Dictionary of Computing, is "an element of data structure . . . that is needed for the execution of a program and that is named or otherwise specified by the allowable character set-of the language in which the program is coded". In this invention, a part can be identified by a storage address. The plurality of data items of a part is used to establish a set of action-specific attributes or parameters associated with a part. Last, the reference portion of a part is provided to link parts together into structured forms.

In FIG. 2, a first part has portions 10, 14, 16, in which the portion 10 includes an identification of the part. The identification can include an address locating the second portion 14 of the part in memory. The second portion 14 includes zero or more data items 15, each data item being provided to establish a respective attribute associated with the part. Last, the part's third portion 16 includes one or more references 18 to other parts 19. The second and third portions may overlap. That is, a reference to another part may be a data item in the group of one or more data items in the second portion.

The two parts illustrated in FIG. 2 are said to be "interrelated" by virtue of the linkage by which the first part references the second part and the second part is referenced by the first part.

Figure 3:
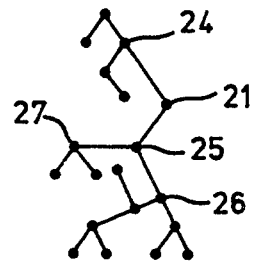
FIG. 3 illustrates a cluster of interrelated parts.

FIG. 3 illustrates a cluster of interrelated parts. In the cluster of FIG. 3, each part refers to or is referred to by at least one other part. Some parts refer to more than one succeeding part. The sense of FIG. 3 is that upper parts refer to lower parts, so that the part represented by the node 21 refers to the part at node 25 and is referred to by the part at node 24. Further, the part represented by the node 25 refers to parts at nodes 26 and 27.

Although FIG. 3 illustrates a uni-directional scheme of reference with the sense being downward, this is by way of example only, and is not intended to exclude clusters with oppositely-directed senses. Nor is FIG. 3 intended to exclude bi-directional reference which would, for example, permit part 21 to refer to and be referred to by part 24.

In general, then, a cluster is simply a set of parts in which each part is related to at least one other part in the cluster. According to the invention, every cluster has an primary part, which is the point at which processing of that cluster begins.

Figure 4:
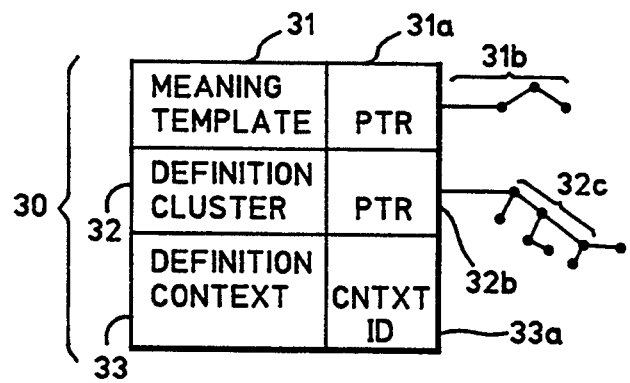
FIG. 4 illustrates a data structure signifying meaning according to the invention.

FIG. 4 illustrates a data structure referred to as a "meaning". In FIG. 4, the meaning 30 includes a meaning template portion 31, a definition cluster portion 32, and a definition context portion 33. The meaning template portion includes a pointer 31a to a cluster 31b of interrelated parts forming the meaning template. The definition cluster portion of the meaning 30 includes a pointer 32b to a part cluster 32c referred to as the "definition cluster" of the meaning 30. The third portion 33 of the part 30 includes a data object ("cntxt ID") 33a which identifies a definition context in which the definition cluster 32c is to be analyzed to give meaning to a current behavior expression.

Figure 5:
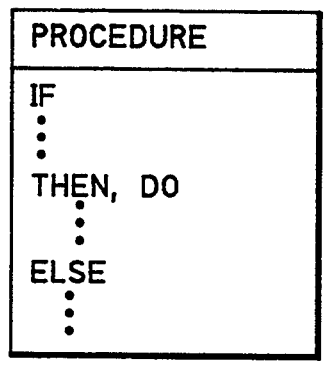
FIG. 5 illustrates an invocable procedure forming a logic component of the invention.

Last, the invention utilizes basic logical functions ("components") which may be implemented in software, in hardware, or in both. FIG. 5 illustrates one such logic component in the form of a software procedure which may be invoked by name for execution.

A subset of the logic components, termed "action primitives" together with basic input/output operations of the system of the invention permit the system to perform useful work on behalf of the user. Execution of one of these procedures is referred to as a control system "action".

Figure 6:
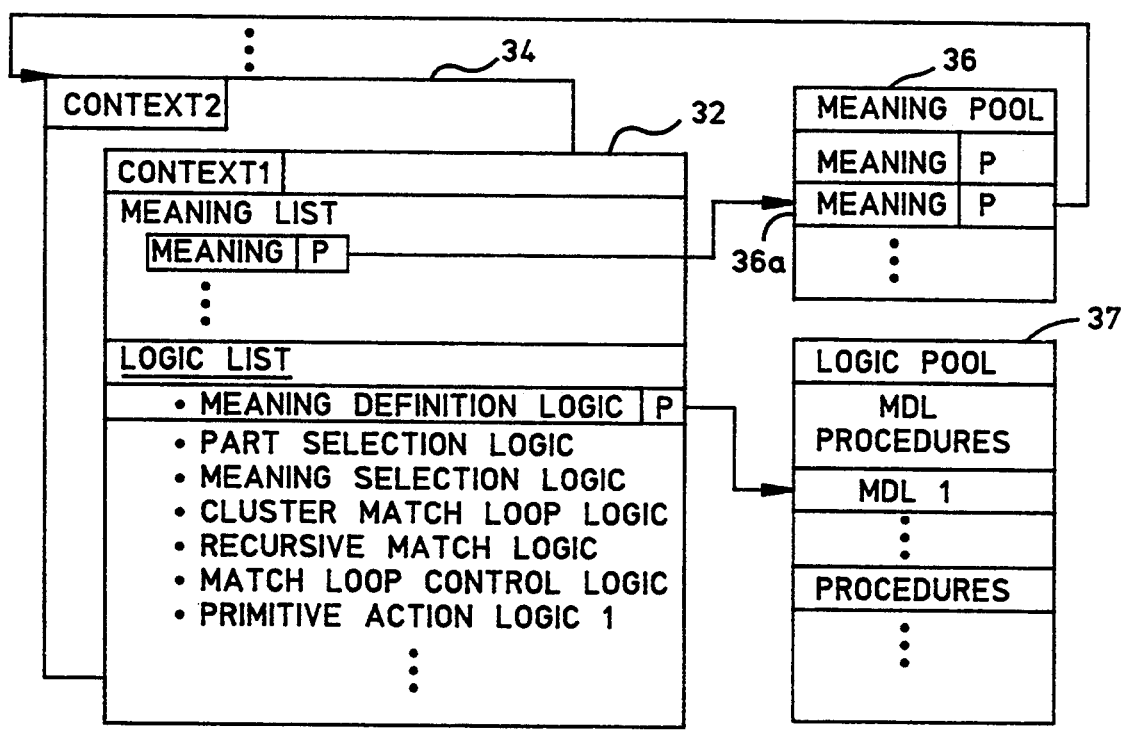
FIG. 6 illustrates the building of context according to the invention.

Useful work is performed by analysis of a behavior expression representing a desired behavior of the system. A behavior expression is essentially a cluster of parts which is given meaning in a specific context. A "context" for the purpose of this invention signifies a collection or set of meanings, together with a collection or set of logic components which are used in the context to apply the meanings to the behavior expression and to execute control system actions. FIG. 6 illustrates conceptually the structure of a context.

In FIG. 6, a plurality of contexts are assumed, two of which are represented by contexts 32 and 34. The contexts have identical structures, but may include different structural elements. Thus, only the structure of the context 32 will be described, the assumption being that this description also applies to all other contexts of the control system. The context 32 has a specific name (CONTEXT 1) that names a structure embracing a set of meanings and a set of logic elements. The meanings have a structure described above with reference to FIG. 4, while the logic elements are presumed in this description to be invocable procedures as illustrated in FIG. 5. Meanings are included in a meaning pool 36, while the logic elements are included in logic pool 37. The context 32 has a meaning list listing specific meanings within the pool 36 which are considered to be included within the context. The inventors contemplate that the meaning sets of contexts may overlap or be exclusive. As FIG. 6 shows, the meaning list of the context 32 includes the meaning 36a in the context. Observe that the third portion of the meaning 36a points to the context 34 thereby permitting a change of context during the operation of the invention.

The context 32 also includes a logic list listing logic components in the logic pool 37 that are included in the context 32. In the preferred embodiment, the minimum complement of logic components for every context includes the following: meaning definition logic, part selection logic, meaning selection logic, cluster match loop logic, recursive match logic, match loop control logic, and primitive action logic. Variations of each of these seven types of logics may be found in the logic pool 37 so that any context may include a particular variation for each logic type. Context logic lists may be exclusive or overlapping.

Figure 7:
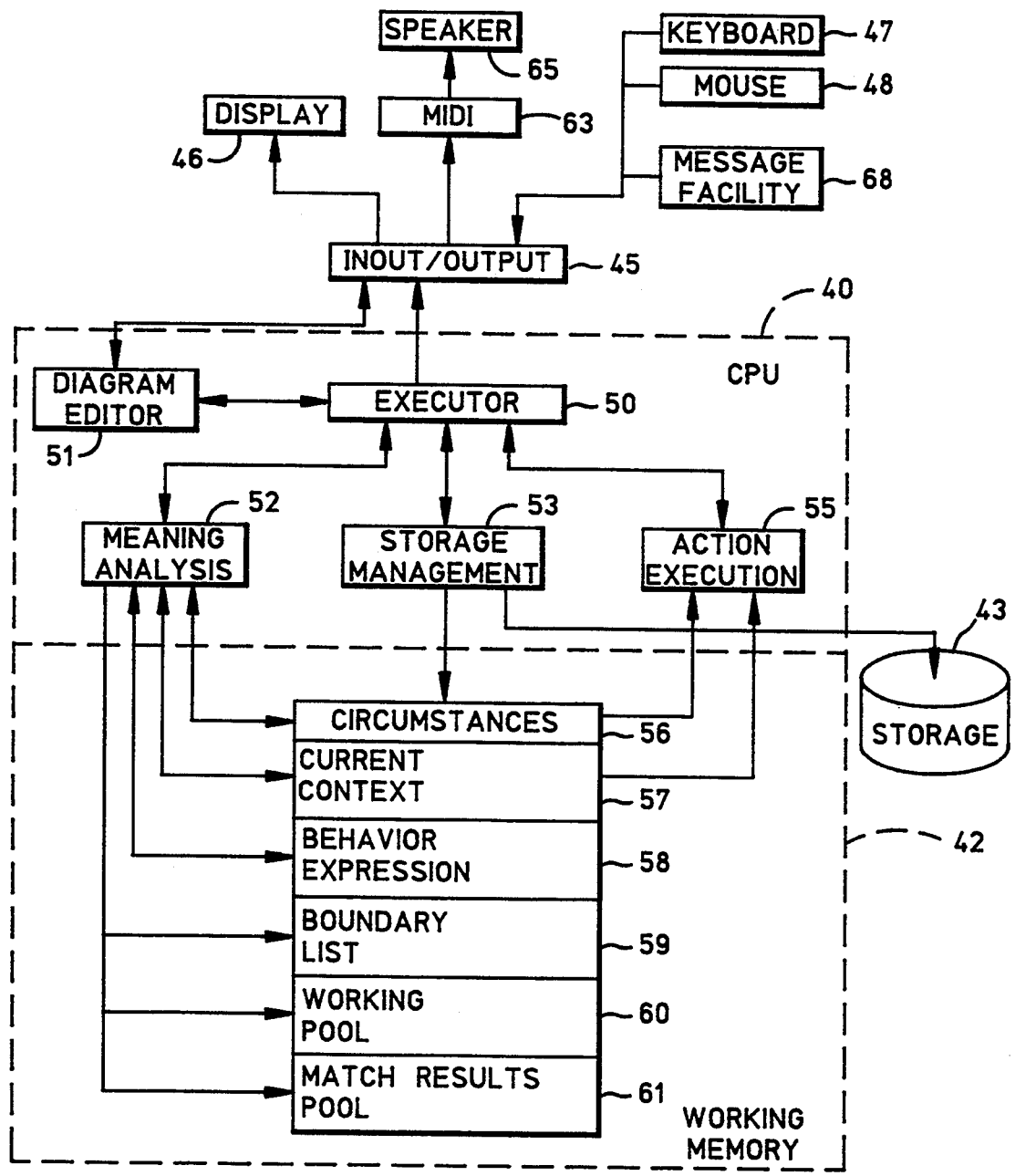
FIG. 7 illustrates structural relationships between elements of the invention.

FIG. 7 illustrates a computer system configured according to the invention. The computer system consists of conventional components, including a central processing unit (CPU) 40, a storage facility including a working memory 42 and direct access storage 43, an input/output facility 45 and system/user interface devices including display 46, keyboard 47, and a mouse 48.

The operation of the invention is controlled and orchestrated by an executor 50 that coordinates the operation of the various parts of the invention with an underlying operating system and maintains the invention's operation flow. The executor 50 oversees and controls a meaning analysis procedure 52 (described below) which determines the meanings of expressions of desired behavior of the control system, determines the meanings of terms which may appear in such expressions, and decides the type of primitive actions to take as a result of processing expressions and terms.

The executor 50 also controls the operations of a storage management function 53. The storage management function 53 provides the ability to access and manipulate various data structures which are required in the operation of the invention. The primary data structures managed by this function are illustrated in the working memory 42 with the understanding that updating them may require access to direct storage 43. The primary structures managed by storage management function 53 are a set of data items called current circumstances 56, the current context 57, the current behavior expression 58 which consists of a part cluster undergoing meaning analysis, a current working pool 60, and a current match results pool 61.

An action execution function 55 is also controlled by the executor 50. The purpose of the action execution function 55 is to perform a sequence of one or more primitive actions which is determined by the primitive action logic of the current context 57 in conjunction with the current circumstances 56 and any properties associated with a part specified by the meaning analysis 52. The range of possible primitive actions is determined by the nature of the underlying means of implementation.

The executor 50 is connected conventionally to the input/output facilities 45 of the computer system and may receive data and commands input by a user through the keyboard 47 and mouse 48. Any aspect of the current state of the control system of the invention is provided visually through the input/output facilities 45 by way of conventional display 46. Another input/output capability necessary for a specific example of operation of the invention (described below) includes a conventional message facility 68 for receiving and transmitting messages.

Meaning Analysis

Figure 8:
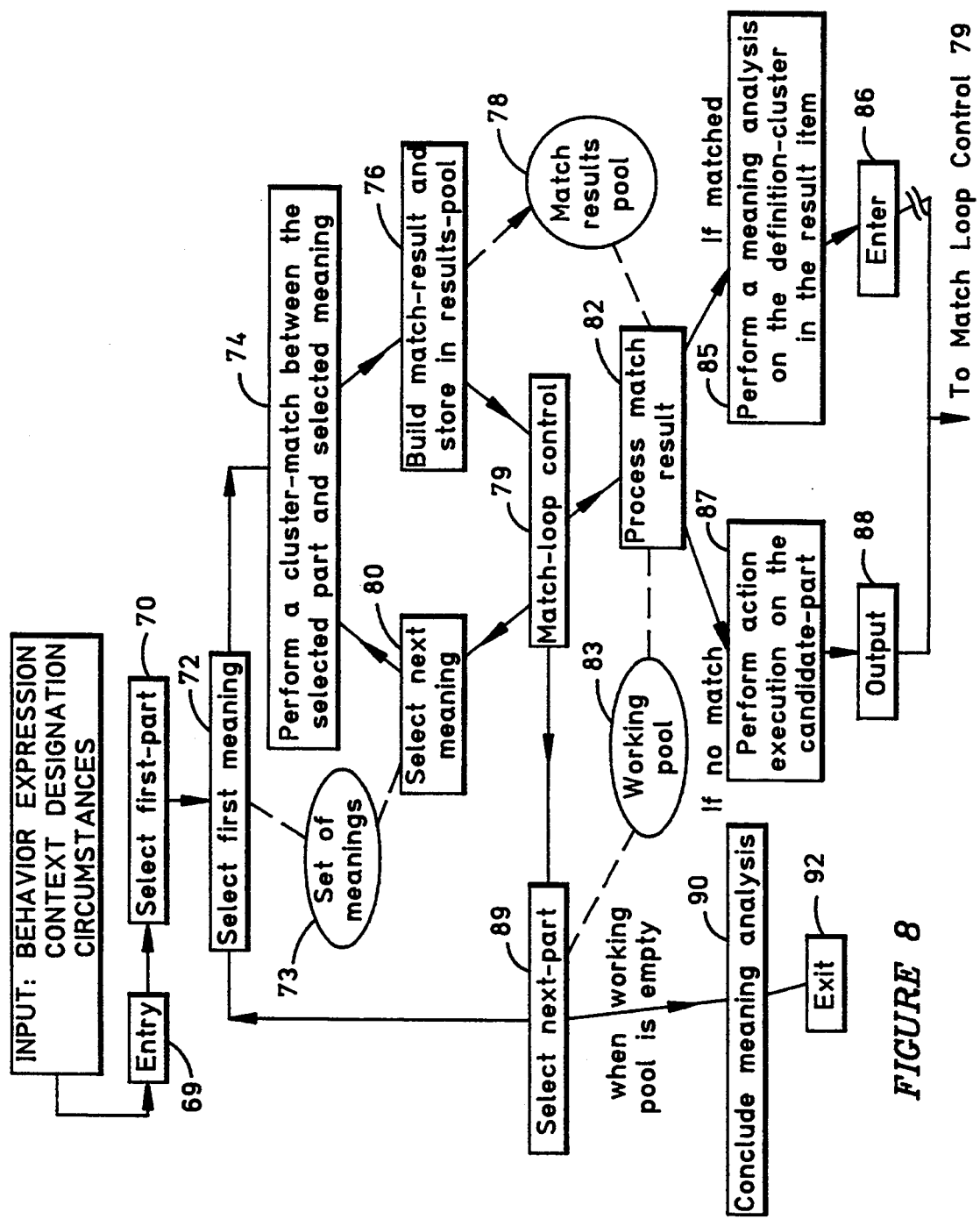
FIG. 8 illustrates a meaning analysis procedure according to the invention.

Refer now to FIGS. 7 and 8 for an understanding of the meaning analysis function. Initially, it is asserted that an intention consists of two elements: a current behavior expression and a context. The behavior expression is a cluster of parts whose purpose is to specify operational aspects of an intention. The purpose of the context is to define a specific set of meanings and associated logical components which are used by the invention in order to translate the behavior expression into action. Circumstances are general data structures containing information reflecting internal and external environmental conditions; circumstances are generated as a result of primitive action execution or as a result of meaning analysis. The storage management function 53 may actively keep some circumstances "up to date" with respect to a given environment. Such circumstances, therefore, reflect the current state of some conditions in the specified environment. Circumstances may also be created or modified as a consequence of the operations of the meaning analysis function 52 and the action execution function 55.

The meaning analysis function 52 operates cooperatively with the storage management function 53, evaluating the current intention in the light of current circumstances so as to specify an appropriate set of actions which are to be performed by the action execution function 55. The meaning analysis function 52 operates by examining the behavior expression and identifying clusters of parts from the behavior expression which match meaning templates from the current context's set of meanings. Current circumstances are updated as may be required for the matching process. Meanings identified by this matching process may themselves be subjected to further meaning analysis.

Further meaning analysis is performed on a given meaning by switching attention away from the current intention and applying the meaning analysis function to an intention associated with the given meaning. In this regard, recall that each meaning has a portion identifying a definition context. When a match is found between a cluster of the current behavior expression and a meaning template in the current context's set of meanings, the current context is replaced with the definition context identified in the matched meaning. In some cases, the contexts may be the same; in other cases, the contexts may be different and thus need to be switched. In addition, the current behavior expression is switched by temporarily replacing the cluster being analyzed with the definition cluster of the matched meaning. Thus, when a match occurs, a new intention is analyzed. The current circumstances in the light of which the new intention is analyzed may include additional information added by the matching step. Ultimately, meaning analysis of this new intention may, in turn, cause additional intentions to be subjected to meaning analysis.

Consequently, the analysis of the overall significance of a particular intention can lead to an expanding number of additional intentions which must be analyzed. This expansion only begins to reverse itself when intentions are encountered whose behavior expressions contain parts that have no corresponding meaning in that intention's context. When a meaning cannot be found for a part in a behavior expression, the primitive action logic 55 is invoked on that part in the light of the current circumstances 56. Based on the part and the circumstances, the primitive action logic decides what action to take.

The meaning analysis function 52 of FIG. 7 is illustrated in more detail in FIG. 8. In FIG. 8, the initial inputs to the meaning analysis function prior to, or concurrent with, the entry step 69 are a behavior expression, a context, and a set of circumstances. During execution, the meaning analysis procedure of FIG. 8 may refer to other behavior expressions and contexts and may modify the current circumstances. The objective of the meaning analysis function is to identify those parts encountered in the access to behavior expressions for which no meaning can be assigned. Such parts are "primitive action specifiers".

Upon entry into the meaning analysis function for the first time, a current context is specified with its set of meanings and its set of logic components and processing begins on the part cluster denoted as the behavior expression, with processing proceeding with reference to the current circumstances. Recall that each context has a particular set of meanings and logic components which are accessed and invoked as required by the meaning analysis function.

As FIG. 8 shows, whenever meaning analysis is initiated on a behavior expression, the first part logic 70 of the current context is activated. The first part logic identifies a single part within the current behavior expression which is temporarily referred to as the "current candidate part". Next, the first meaning logic 72 of the current context is activated to select an initial meaning from the set of meanings 73 of the current context. This meaning is routed, along with the candidate part, to cluster matching logic 74, where an attempt is made to find a "candidate cluster" in the behavior expression that matches the meaning template of the selected meaning. In this regard, a "current candidate cluster" is any cluster in the behavior expression whose primary part is the current candidate part. Relatedly, a "primary part" is a part from which a candidate cluster emanates. If the match is successful, certain information concerning the match is assembled at step 76 into a match result item which is stored in the match results pool 78 for the context. Each match result item in the match results pool contains, at least:

(1) a boundary list which identifies those parts in the behavior expression falling just outside the candidate cluster;

(2) the definition cluster associated with the meaning whose meaning template matches the candidate cluster; and (3) the portion of the matched meaning containing the definition context identifier.

Match loop control logic 79 is now activated to make two independent determinations: (1) when to process match result items from the match results pool 78, and (2) when to quit the cluster match loop 74, 76, 79, 80. If the match loop control logic 79 decides to continue in the cluster match loop, it invokes the next meaning logic 80 of the current context to select from the set of meanings 73 the next meaning to be routed along with the current candidate part to the cluster matching logic 74 where another match attempt is made. Match result items accumulated in the match results pool 78 are processed at 82 at the discretion of the match loop control logic 79. As each match result item is processed by 82, the parts in its boundary list component which are not already in the working pool 83 are added to it. For each new match result item, a new instance of the meaning analysis function will be entered at 85. Each new instance of the meaning analysis function will use the definition cluster as its behavior expression, will use the identified definition context as its current context, and will employ a new set of circumstances consisting of the circumstances of the previous meaning analysis instance. Once the match loop control logic 79 determines that there are no more meanings to be tested, it invokes the process match result in step 82 to perform a final evaluation of the match results pool 78, before leaving the cluster match loop 74, 76, 79, 80 and moving on to the next candidate part. In this final invocation of the result item processing step 82, any remaining match results in the match results pool 78 are processed and a meaning analysis is selectively launched at 85. If, at this point, it is determined that the cluster match loop was not successful in finding any match for the current candidate part among all the meanings selected from the current set of meanings, then the action execution step 87 is invoked to perform the action corresponding to the unmatched candidate part. When step 87 is performed for the current candidate part, its boundary list is computed and these parts are added to the working pool. It should be noted that the action execution step 87 is performed on a given candidate if, and only if, no meaning analysis is performed at 85 for this candidate part. When the match loop control logic 79 has finished this last increment of work, it activates the next part logic 89 of the current context. The next part logic 89 selects a new candidate part from the working pool 83 and loops back to the entry to the cluster match loop at step 72. If the next part logic 89 detects that the working pool 83 is exhausted, this instance of the meaning analysis process is concluded at 90 and exited at 92. Upon exit, a meaning analysis suspense list is consulted to determine whether any prior instances of meaning analysis have been suspended. If so, the next most recent instance is reactivated, and so on, until the first instance has completed, in which case the overall meaning analysis function is exited.

The cluster matching loop 74, 76, 79, 80 is given, as input, a candidate part and a meaning part. Naturally, from the candidate part, the cluster matching logic 74 is able to inspect smaller clusters in the cluster forming the behavior expression which have the candidate part as their primary part. Such clusters are referred to as "candidate clusters". Cluster matching is essentially embodied in a pattern-matching operation which seeks to determine if there is a candidate cluster in the behavior expression which matches a meaning's meaning template. In general, a cluster match involves comparing sets of attributes or properties contained in the data item portions of parts and a certain methodology by which those properties or attributes of parts in the meaning template are compared with corresponding properties or attributes of parts in a candidate cluster. This logic is required to examine candidate clusters in the behavior expression which might possibly match the meaning template.

The inventors contemplate that the cluster match function may be implemented using any pattern-matching method which can verify that each part in the meaning template has a corresponding part within a candidate cluster in the behavior expression. If this necessary and sufficient condition cannot be verified, no match exists. If the condition can be verified, a match does exist. The cluster matching function must transmit certain information back to the meaning analysis instance responsible for its activation. The cluster matching logic must also indicate success or failure of the match attempt and provide the boundary list of parts directly related to the candidate cluster (or to the candidate part itself in the case of an unsuccessful match). Cluster matching logic may also include match-specific information produced by this particular attempt. If a particular set of match criteria establishes several different ways in which a correspondence can be said to exist between a part of the current behavior expression and a part in the meaning template, it may be desirable to indicate which of these different ways was used in a particular match.

The action execution step 87 performs a sequence of one or more primitive action executions. Primitive actions are executed by the primitive action logic of the current context. This logic is given access to a specified part and the current circumstances. Based on this information, the primitive action logic executes a primitive action sequence. The range of possible primitive actions is limited only by the nature of the underlying means of implementation. It may be that some of these primitive actions are NO OP steps; it may be that other of these primitive actions produce results which are to be provided discernible form to a user. In this case, an output step 88 is invoked and a discernible indication of the action is provided to the user. When candidate part processing is completed, return is made to the match loop control 79.

In Appendix F, in C++ language format, a pseudocode expression is given for the meaning analysis function illustrated in FIG. 8.

EXAMPLE: MESSAGE HANDLING

Overview

Consider applying the invention to the task of providing automated support for a routine office environment activity such as scheduling meetings. This example looks at a small part of this activity: namely, the handling of meeting requests. It is assumed that meeting requests are sent to prospective meeting participants via electronic mail (as through the message facility 68 in FIG. 7). Replies are also expected by electronic mail. The point of the example is to demonstrate: (1) how the invention may be used to specify the behavior of an automated system which assists a human user in the task of responding to electronically delivered meeting requests; and (2) how the invention may be used to adapt such a specification to the requirements of an individual user.

For the sake of brevity, much of what would exist in an actual meeting scheduling system is not discussed in this example. The problem is explored in a simplified form and many complex elements of a real system are assumed to exist for the purposes of this example. In particular, it is assumed that an electronic mail system is in use within an organization whose members must make frequent meeting arrangements. In addition, it is assumed that each user makes use of an electronic calendar system which maintains a database of scheduled time commitments for that user and provides access to meeting room schedule information. It is also assumed that the basic operational capabilities of both the electronic mail system and the calendar system can be used as primitive elements by a higher-level system constructed in accordance with the method of the invention and described here.

In this example, the invention is used to specify the steps to be taken by the system responsible for responding to a meeting request received via electronic mail. A request message is assumed to contain information items in a preordained order which indicate the who, what, where, when and why of an event. This example only considers events for which the "what" is "a meeting". The "who" field specifies the intended participants and may consist of a list of names of individuals and/or groups. It is assumed that when a group is named, the names of the individuals which comprise that group are also available to the system. The "where" field identifies the proposed location of the requested meeting. The "why" field gives the subject matter of the proposed meeting. And the "when" field gives the proposed meeting time.

In this example, a meeting request can result in one of the following actions: accept request, decline request, propose alternate participants, or propose alternate time and place. Given a specific request and a database containing personal schedule information for a specific user and general information about the organization, the system must proceed through a series of logical steps to determine which of the above actions is appropriate. This series of steps will be defined in terms of a number of diagrams (which are more fully discussed below). There are two cases presented in this example. The first case gives what might be thought of as a "standard" or "default" method of handling a message request. For this case, the diagrams in FIGS. 9A thru 12E apply. The second case demonstrates how the desired behavior of the system can be changed. For this case, the diagram in FIG. 14 will be applied instead of the diagram in FIG. 10.

Significance of Diagrams

A diagram is a two-dimensional visual representation consisting of an organized collection of separate visual elements. This example presumes the existence of a diagram-editor (similar to a graphical tool such as a CAD/CAM system) which is a computer-based system that allows a user to create and store diagrams as well as access and modify previously stored diagrams. The diagram-editor (reference numeral 51 in FIG. 7) has the ability to manipulate both the on-screen visual diagrammatic elements as well as their corresponding, computer-oriented representations. For the purposes of this example, a number of diagrams will be used to define the intended behavior of the system.

Machine Representation of Diagrams

A diagram is represented within the machine as a collection of data objects known as parts. Every part has the three portions described above. In this example, the data items of the second portion of a part are properties, each of which consists of a "property-kind" and a "property-value". The property-kind identifies the nature and purpose of a given property while the property-value contains information in a form appropriate for a given property-kind. In this message handling example, there are only three basic forms by which a part is represented on-screen. A part may appear as either a box, a connector or a triangle and it may be drawn with either a solid, bold, or dashed line. These characteristics of a part are stored as properties with the following property-kinds and property-values:

| Property-Kind | Property-Value |
|---|---|
| type | either "box", "connector" or "triangle". Each part must contain exactly one of these properties. |
| style | either "solid", "bold", or "dashed". Each part must contain exactly one of these properties. |

There are several notational conventions that are useful to introduce at this point:

1. The property-kind of a property may be used to characterize or qualify a property. Thus, if a property within a part has a property-kind of "type", this property may be referred to as the "type property" of that part. Similarly, if a property within a part has a property-kind of "style", this property might be referred to as the "style property" of the part.
2. Both the property-kind and the property-value can be expressed by a statement to the effect that a given part has a type property of "box". What is meant by this statement is that the given part contains a property whose property-kind is "type" and whose property-value is "box".
3. A part may be characterized by its type property (since every part must contain such a property). Thus a part whose type property is box may be referred to as a "box". Similarly, a "connector" is a part whose type property is connector and a "triangle" is a part whose type property is triangle.
4. A part described as a box, a connector or a triangle may be further qualified by its style property. Thus, a connector may be "solid", "bold", or "dashed".

Making use of these short-hand conventions, additional constraints on properties can be described. A "connector" will always possess the following additional properties:

| Property-Kind | Property-Value |
|---|---|
| source | the identity of the part from which the connector emanates. |
| target | the identity of the part at which the connector terminates. |

According to the above, a connector's source property is said to point at the part which is the source of the connector, and the target property points at the connector's target. A connector's source and target properties are matched by two additional properties:

| Property-Kind | Property-Value |
|---|---|
| source-of | this property indicates the part is the source of a connector; the value of this property is a reference to the connector. Multiple source-of properties are permitted per part. |
| target-of | this property indicates the part is the target of a connector; the value of this property is a reference to the connector. Multiple target-of properties are permitted per part. |

Finally, there is one property whose existence is optional:

| Property-Kind | Property-Value |
|---|---|
| text | a string of characters which are to be associated with the part. These are displayed inside the outline of a box or triangle and near the mid-point of a connector. Only one text property is permitted per part. |

Figure 9A:
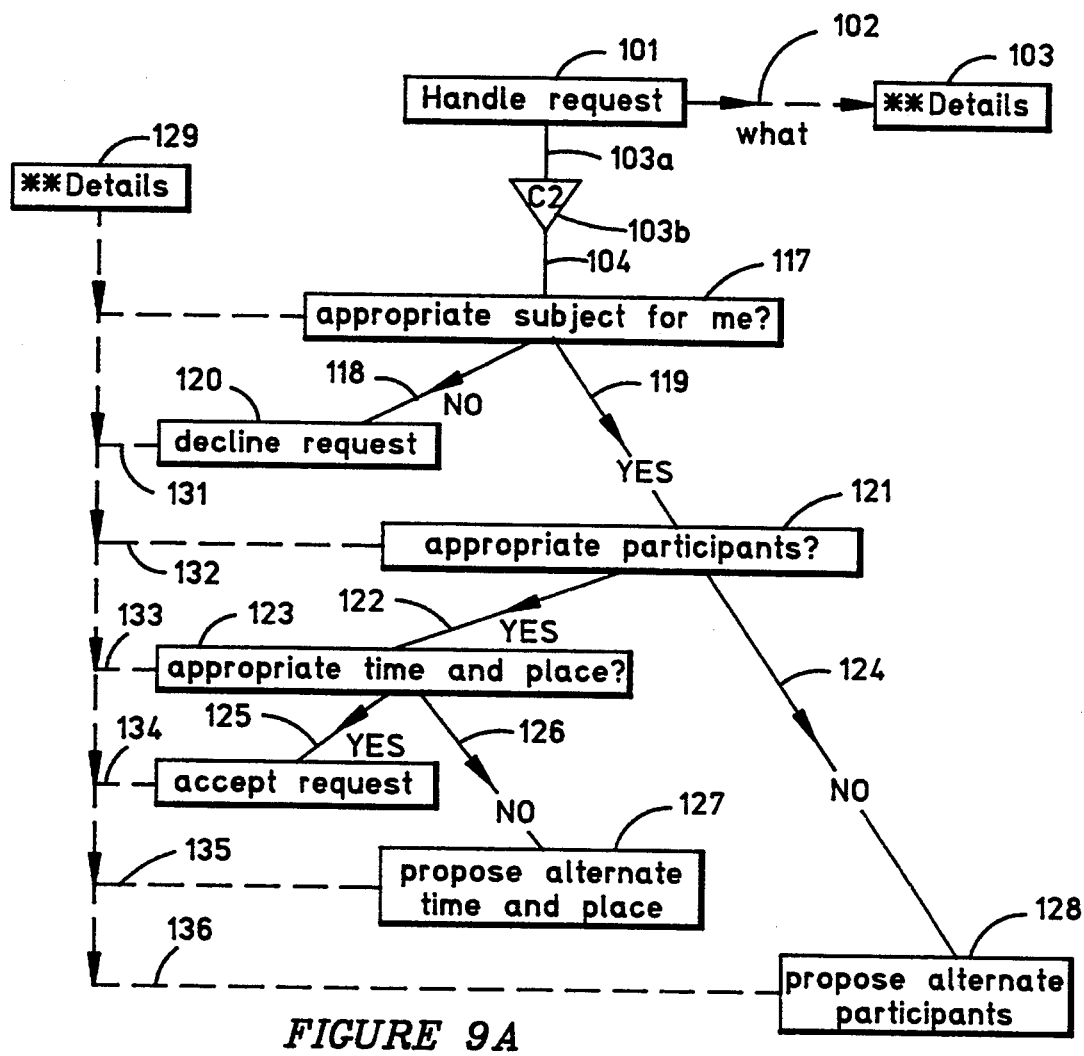
FIGS. 9A–14 are diagrammatic representations of behavior expressions and meanings used to illustrate an example of the invention's operation.

Each part may also contain certain properties used by the diagram-editor such as those used to specify the on-screen coordinates of the corresponding visual element (the visible representation of a part). These properties will not be discussed further here. FIG. 9A is a diagrammatic representation of a collection of parts.

Each box, triangle or connector which appears in diagram will also have a corresponding internal machine representation which conforms to the requirements set out above. Consider the parts 101, 102, 103, 103a, 103b, and 104 which appear at the top of FIG. 9A. The internal, machine representation of these parts would include:

part (101):
 has a type property of box,
 has a style property of solid,
 has a text property of "handle request",
 has a source-of property which references (or points at) part (102),
 has a source-of property which points at part (103a) (the solid connector attached to the triangle).

part (102):
 has a type property of connector,
 has a style property of dashed,
 has a text property of "what",
 has a source property which points at part (101),
 has a target property which points at part (103).

part (103):
 has a type property of box,
 has a style property of solid,
 has a text property of "**details",
 has a target-of property which points at part (102).

part (103a):
 has a type property of connector,
 has a style property of solid,
 has a source property which points at part (101),
 has a target property which points at part (103b).

part (103b):
 has a type property of triangle,
 has a style property of solid,
 has a target-of property which points at part (103a).
 has a source-of property which points at part (104).
 has a text property of "C2"

part (104):
 has a type property of connector,
 has a style property of solid,
 has a source property which points at part (103b),
 has a target property which points at part (117).

The remaining diagrammatic elements in FIGS. 9A thru 12E and 14 will have internal representations which correspond in a similar fashion.

DETAILED DISCUSSION OF THE EXAMPLE

In accordance with the Detailed Description of the Preferred Embodiment, several things are required for a fully functioning system. The system's executor component must be able to construct and initialize one or more context data structures in which each context contains a series of meanings and a collection of logic components. It is assumed that the executor has the ability to access the diagrams necessary for each case of the example discussed here. Further, it is assumed that the executor has the ability to access the logic components described in detail below and to properly associate these logic components with the three contexts used in this example. When the executor begins operation, it must initialize all the parts of the system which are under its control. As part of initialization, the executor will initialize the default context C1 along with any other context it may detect. The default context is always assumed to exist. An additional context is designated by the existence of a part whose type is "box" and whose style is "bold".

Meaning-Definition-Logic

The meaning-definition-logic component for this context is found in the diagram editor, described above. The logic must:
1. Search all diagrams for collections of parts which can be recognized as meanings by this meaning-definition-logic,
2. For each meaning so identified, find and store the primary-part of the meaning-template, the primary-part of the definition-cluster and the definition-context to be used for the meaning.

The definition-cluster-logic used in this example employs a simple set of conventions which permit these steps to be carried out. A user who wishes to create a new meaning uses the diagram-editor to construct a cluster of diagrammatic elements (parts) which is the desired meaning-template and another cluster of parts which is the desired definition-cluster. This logic employs a diagrammatic convention by which these two clusters may be associated together and identified as a meaning in such a way that their distinct roles are preserved.

According to the simple convention used in this example, triangles are reserved for the purpose of identifying meanings. So, a triangle is not permitted to exist within either a meaning-template, a definition-cluster, or the system's initial behavior-expression. The user marks the existence of the new meaning by creating a triangle and two connectors. The meaning-template is designated by creating a connector whose source is the primary-part of the meaning-template and whose target is the triangle. The definition-cluster is designated by creating a connector whose source is the triangle and whose target is the primary-part of the definition-cluster. This simple convention unambiguously indicates the existence of a meaning and identifies the primary-parts of both the meaning-template and the definition-cluster. The text property of the triangle is used to designate the definition-context that is to be associated with the meaning.

Given this convention, the meaning-definition-logic builds the context's meanings-list by searching the diagrams for triangles and then inspecting the two connectors which are, according to this convention, attached. It can be seen, then, that the primary-part of the meaning-template is the part pointed at by the source-of property of the connector whose target property points at the triangle. Looking at FIG. 9A, the triangle is part 103b. This triangle is pointed at by the connector 103a. The source-of property of this connector points at part 101. Thus, part 101 is the primary-part of a meaning-template. The primary-part of the definition-cluster is the connector whose source property references the triangle. Looking again at FIG. 9A, part 104 is the primary-part of the definition-cluster. As each meaning is added to the meanings-list, the triangle and its two adjacent connectors must be identified in some way so that later processing will not erroneously consider them to be part of a meaning-template or a definition-cluster. This is done here by adding these parts to a list of parts already matched in this context.

The definition-context saved with a meaning is the context designated by the text property of the triangle. Thus, for example, the triangle 103b of FIG. 9A includes a text property "C2", which identifies the context C2. This means that the definition cluster whose primary part is 104 is to be evaluated in context C2. It is assumed in this example, that the items identified as meanings are stored in a simple list in whatever order the they are encountered by the meaning-definition-logic. This simple list storage device constitutes the meanings-list for the context.

Figure 10:
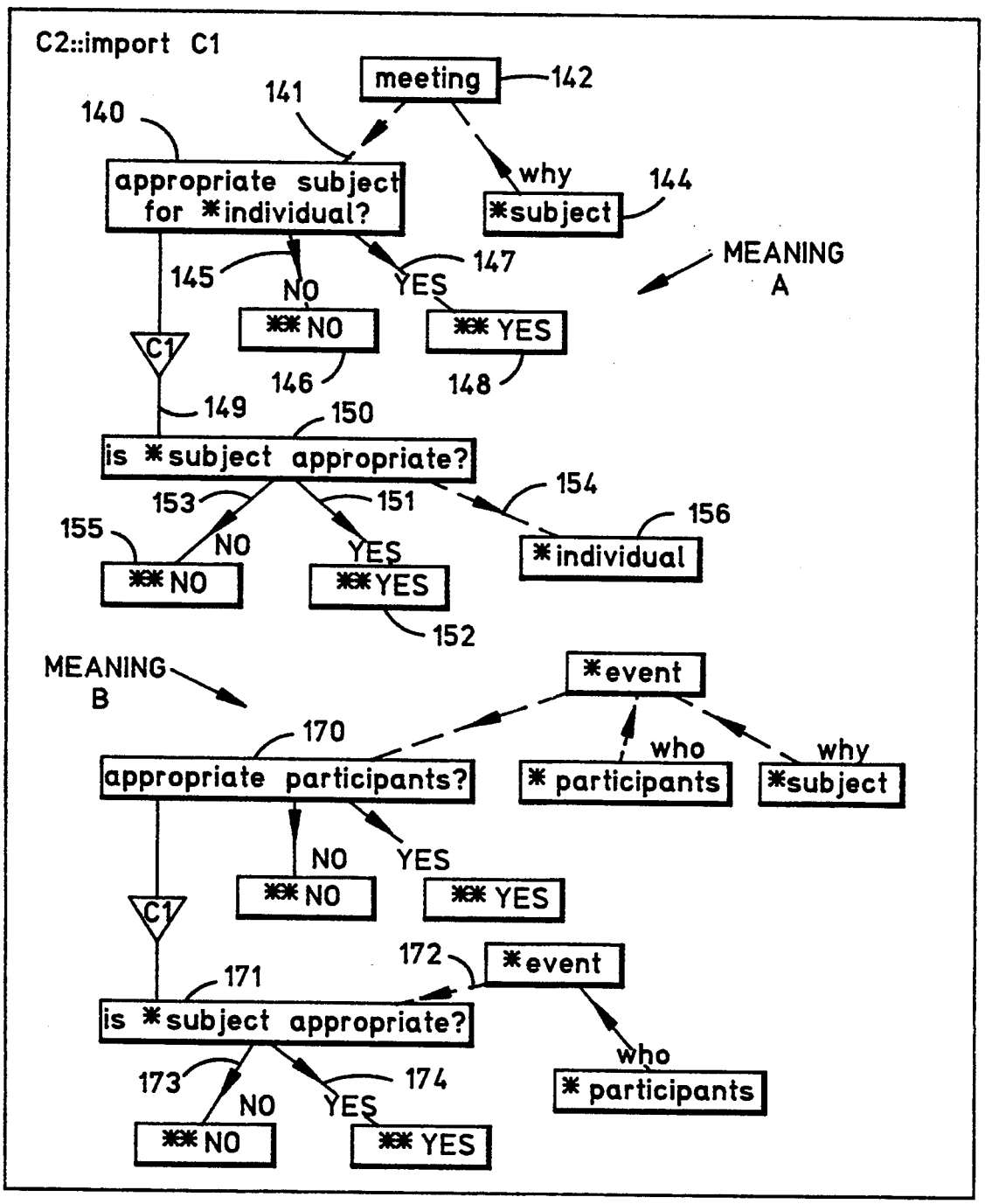
Figure 11A:
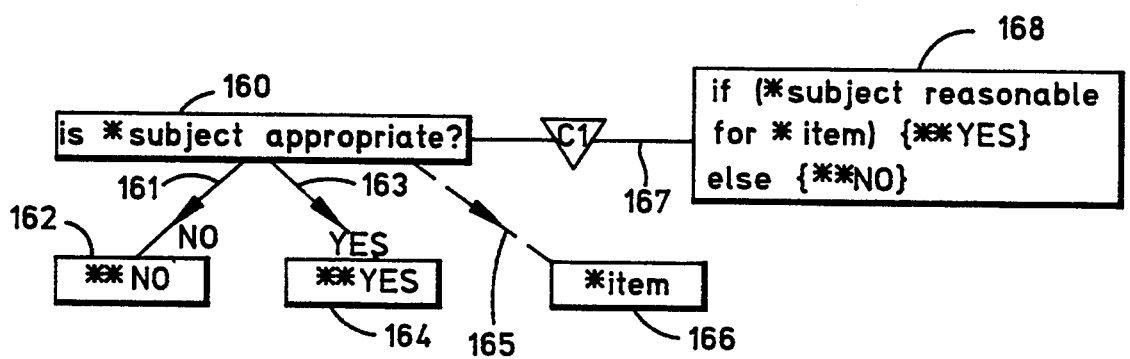
Figure 11B:
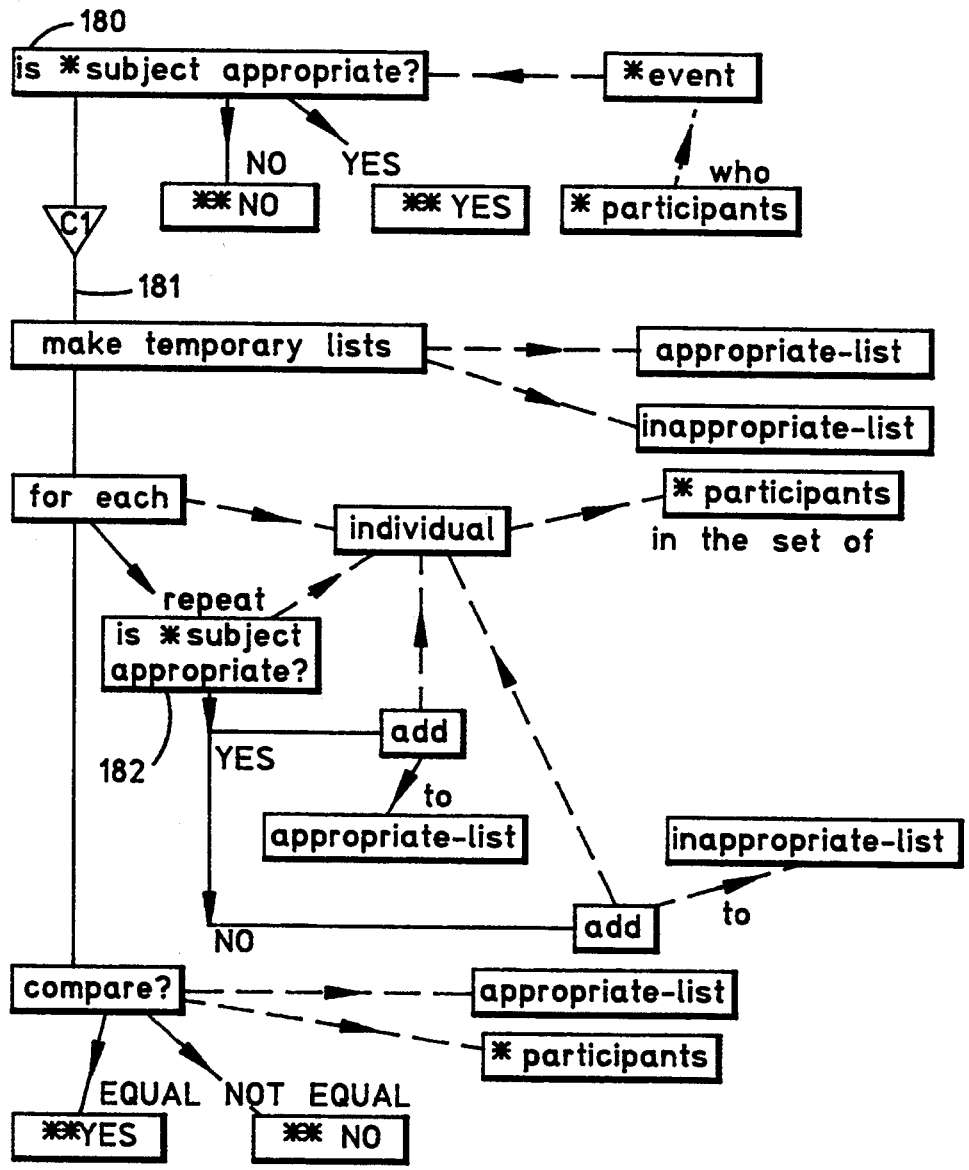
Figure 12A:
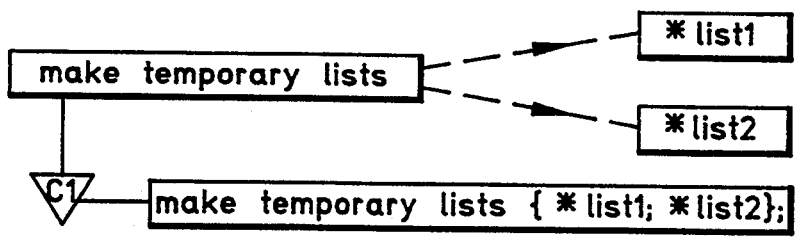
Figure 12B:
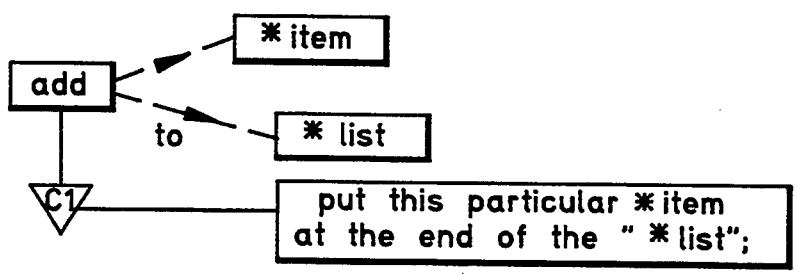
Figure 12C:
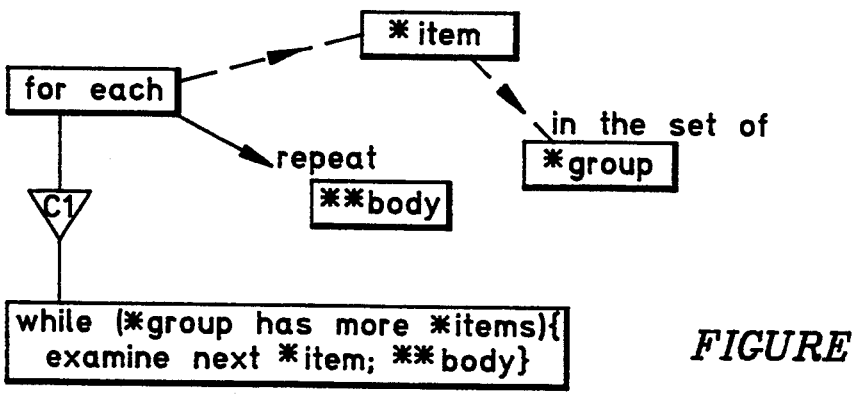
Figure 12D:
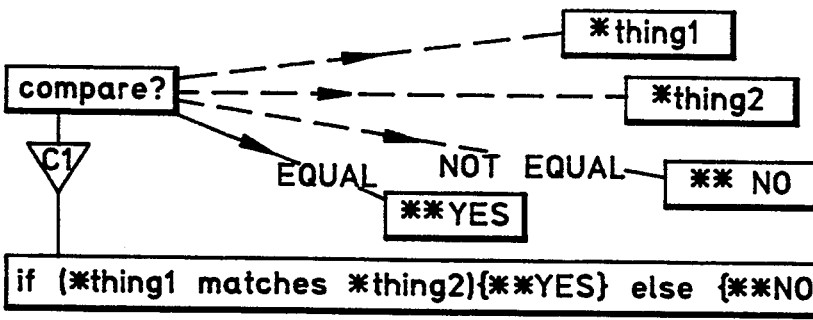
Figure 12E:
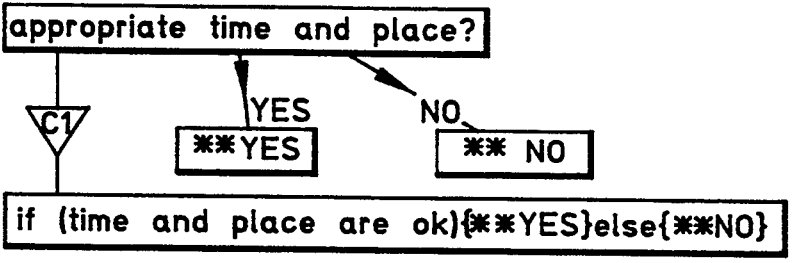

Observe that in FIG. 10, the illustrated meanings (A and B) are enclosed in a single rectangle, together with the notation "C2::import C1". This indicates that these meanings are defined in context C2 and that context C2 "imports" the meanings from context C1. Similar notation is found in FIG. 14.

Initial Behavior-Expression

Figure 9B:
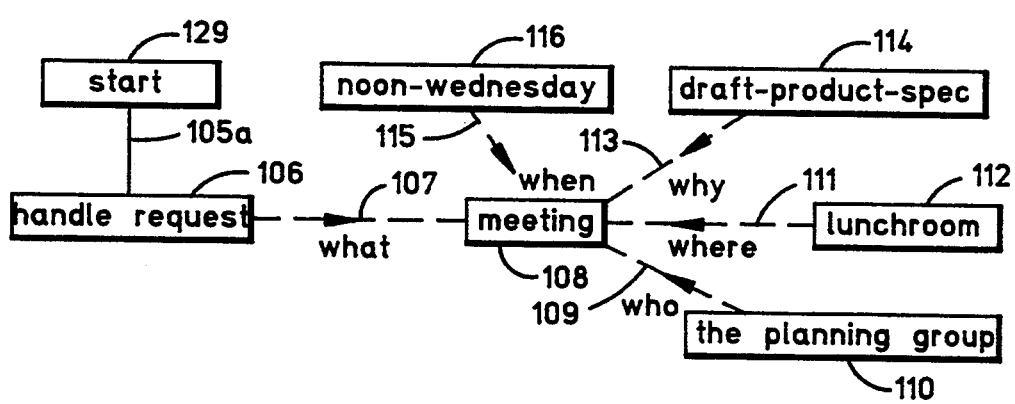

FIG. 9B shows the example's initial behavior-expression. It is assumed that the initial behavior-expression for a system begins with a box whose text is "start" (as with part 105). The point of this behavior-expression is to test the meaning of "handle request" with a sample request for a meeting at noon-wednesday, in the lunchroom, for the purpose of draft-product-spec with the members of the planning group as participants. Here, the executor is presumed to have initialized the text properties of parts 108, 110, 112, 114, and 116 from the corresponding fields of the an electronic mail message like:

| what:  | meeting            |
|--------|--------------------|
| who:   | the planning group |
| where: | lunchroom          |
| why:   | draft-product-spec |
| when:  | noon-wednesday     |

Meaning Analysis Applied to the Example

As discussed in the Detailed Description of the Preferred Embodiment, the system's intention is evaluated by the executor through a meaning analysis process which is presented with an initial behavior-expression, a context and a set of circumstances. In this case, the initial behavior-expression is given by FIG. 9B, the context is the global context (C1) which is assumed to exist for this example, and the set of circumstances is initially empty (that is, an internal machine data structure which is capable of storing various items of information but which has been initialized to contain no such items). It is also assumed that the meaning-definition-logic for each context has been activated so as to result in the construction of a meanings-list data structure for each context. For sake of the example, assume that the triangles in the diagrams are encountered in the order in which the figures are presented here. Thus, the meanings-list for context C1 will be ordered so as to correspond with FIGS. 9A, 11A, 11B, 12A, 12B, 12C, 12D, and 12E. The first two meanings in the meanings-list for context C2 will correspond with meanings A and B in FIG. 10. The remainder of C2's meanings-list will be copied from C1's meaning-list because "::import C1" appears in the text property of C2. Similarly, the meanings-list for context C3 will consist of the meaning that corresponds with FIG. 14 followed by the meanings from C1's meaning-list because "::import C1" also appears in the text property of C3. Note that FIG. 9B does not contain a triangle and so has no corresponding meaning in any meanings-list.

The Example is next illustrated with a step-by-step description of the operation of the invention. This description is intended to be read with reference to FIGS. 9A–12E and to the logic descriptions which follow it. The following steps are now performed:

1. The executor creates a new instance of the meaning analysis process shown in FIG. 8, and gives it references to the initial behavior-expression, the global context and the current circumstances.
2. Next, C1's first-part-logic (see logic description 1.1.1) is activated in order to select an initial candidate part. When activated for the first time, the first-part-logic searches the behavior-expression for a box whose text is "start". Given the initial behavior-expression shown in FIG. 9B, part 105 will be selected by the first-part-logic.
3. With this part as the current candidate part, C1's first-meaning-logic is now activated (see logic description section 1.2.1). The first-meaning-logic will pick the first meaning on the context's meanings-list. This first meaning is the one represented in FIG. 9A.
4. References to the primary-part of this meaning's meaning-template (part 101) and the current candidate part (part 105) are routed to C1's cluster-match-logic (see logic description 1.3.1).
5. Cluster-match-logic begins by invoking the match-parts-logic (see logic description 1.3.2) in order to compare parts 101 and 105.
6. While parts 101 and 105 have matching type and style properties, their text properties fail to match. Match-parts-logic reports failure to cluster-match-logic.
7. Cluster-match-logic notes the failure and calls C1's get-parts-logic (see logic description 1.3.4) passing it a reference to the current candidate part (part 105).
8. Get-parts-logic inspects part 105 and notes that it has a source-of property. The connector referenced by this property (the connector 105a) is examined. Since the style property of this connector is "solid", a reference to this part (connector 105a) is added to the parts list being built (the "boundary list"). At this point get-parts-logic is finished because part 105 has no more properties of interest (see logic description 1.3.4). Get-parts-logic returns a list containing only part 105a.
9. Cluster-match-logic now returns to the instance of meaning analysis which invoked it, passing back the boundary list built by get-parts-logic and a failure indication.
10. Meaning analysis now builds a result-item (the build step 76 in FIG. 8) consisting of the boundary-list (which contains part 105a only) and the failure indication. This result-item is stored in the results-pool for this instance of meaning analysis (see FIG. 8, step 78, and FIG. 15).
11. Next, the match-loop-control-logic (FIG. 8, reference numeral 79) is activated. This logic functions by processing each result-item as it is generated (see logic description 1.3.5). In this case, since the result-item indicates failure, the next-meaning-logic is activated (see logic description 1.2.2). Given the earlier assumption as to the order of meanings in the meanings-list, the next-meaning-logic will return a reference to the meaning shown in FIG. 11A.
12. Meaning analysis will now attempt another cluster-match (as in step 4 above), this time with the current candidate part (part 105) and the primary-part of the next meaning found in the meanings-list (part 160).

13. The above steps 4 through 11 will be repeated for each meaning in the meanings-list. By examining the diagrams involved in the example, it can be seen that there is no meaning that will match the part 105. These steps will be repeated essentially as described above until the match-loop-control-logic (step 11) is encountered after an uncessful attempt to match the last meaning.

14. At this point, the example is in match-loop-control under conditions that will cause the next-meaning-logic to report that there are no more meanings to examine. As described below in logic description 1.3.5, match-loop-control will now activate the primitive-action-logic, giving it a reference to the current candidate part (part 105).

15. The primitive-action-logic (see logic description 1.4) will examine each word in the text property of the part, looking for words which begin with the character "*". In this case, there is only one word ("start") and it does not begin with a "*", so the word "start" is written into the system's log file and control is returned to the match-loop-control-logic. Match-loop-control-logic now accesses the current result-item, copies its boundary-list (consisting of part 105a only) into the working-pool (FIG. 15) and returns to meaning analysis with a result indicating that a new candidate part should be selected.

16. Meaning analysis now activates the next-part-logic (FIG. 8, reference numeral 89). Next-part-logic (see logic description 1.1.2) takes a part from the working-pool (FIG. 15) and makes this part the current candidate part. In this case, the new candidate part will be the connector 105a.

17. Meaning analysis once again sets about searching the meanings-list for a successful cluster-match. This is done by again invoking C1's first-meaning-logic. This corresponds to step 3 above (but this time with part 105a as the current candidate part).

18. As was true previously, there is no meaning in the meanings-list that will successfully match the connector 105a. Therefore, meaning analysis will cycle through the meanings-list as it did before, with match-parts-logic failing every time. The only real difference in attempting to find a cluster match with connector 105a is that when get-parts-logic inspects this part (in accordance with logic description 1.3.4), it will not find a source-of property. Instead, a source and a target property will be detected. When the source property is examined, get-parts-logic will note that the part referenced by this property (part 105) has been marked as matched in the current meaning analysis instance and, consequently, part 105 will not be placed on get-part-logic's list. When the target property is examined, get-parts-logic will note that the part referenced by this property (part 106) has not been marked as matched and will, consequently, place part 106 on the list it returns to cluster-match-logic. As in steps 9 and 10, cluster-match-logic returns this list to meaning analysis where the list becomes the boundary-list in a new result-item which takes the place of the old one in the results-pool (FIG. 15).

19. Control will finally arrive at match-loop-control-logic with the meanings-list having again been fully examined. As before in step 14 above, match-loop-control-logic will activate the primitive-action-logic, giving it a reference to the current candidate part (this time part 105a). Primitive-action-logic (logic description 1.4) will attempt to examine each word in the part's text property. Since this part has no text property, primitive-action-logic returns, taking no action. Match-loop-control-logic now copies the current result-item's boundary-list (this time consisting of part 106 only) into the working-pool (FIG. 15) and returns to meaning analysis with a result indicating that a new candidate part should be selected.

20. Meaning analysis now activates the next-part-logic. Next-part-logic (see logic description 1.1.2) takes a part from the working-pool (FIG. 15) and makes this part the current candidate part. In this case, the new candidate part will be the box 106.

21. Meaning analysis again sets out to find a successful cluster-match. This is done by invoking C1's first-meaning-logic (reference numeral 72 in FIG. 8) which again corresponds to step 3 above (but now with part 106 as the current candidate part).

22. In the case of the two candidate parts examined so far (parts 105 and 105b), both parts failed all cluster-match attempts. With part 106 as the current candidate part, a successful cluster-match will occur.

23. References to the current candidate part (part 106) and the primary-part of the first meaning (part 101) are routed to C1's cluster-match-logic (see logic description 1.3.1).

24. Cluster-match-logic invokes match-parts-logic (logic description 1.3.2) to compare parts 101 and 106. Since parts 101 and 106 have matching type, style and text properties, match-parts-logic reports success to cluster-match-logic.

25. Cluster-match-logic next invokes get-parts-logic (logic description 1.3.4), passing it a reference to the candidate part, in order to build a "candidate_list" of parts referenced by the candidate but excluding any parts previously matched. In this case, the candidate_list will contain just one part, the connector identified as part 107 in FIG. 9B.

26. Cluster-match-logic invokes get-parts-logic again, this time passing it a reference to the meaning part (part 101), in order to build a "meaning_list" of parts referenced by the meaning part but excluding any parts already matched during this match attempt. The meaning_list will also contain just one part, the connector identified as part 102 in FIG. 9A.

27. Cluster-match-logic now invokes C1's recursive-match-logic, giving this logic access to the candidate_list and the meaning_list.

28. Recursive-match-logic (logic description 1.3.3) performs the function of comparing a candidate_list with a meaning_list and invoking itself again (recursively) as many times as may be necessary to fully explore the meaning-template. Proceeding with logic description steps 1.3.3.A, recursive-match-logic determines that there is only one possible pairing of parts from the two lists (since each list contains only one part). At this point, the m-part is part 102, and the c-part is part 107.

29. Proceeding with logic description steps 1.3.3.B and 1.3.3.C, recursive-match-logic applies getparts-logic to the m-part (part 102) to build a "meaning—grandchildren" list consisting of part 103.
30. Next (1.3.3.D) match-parts-logic is invoked to determine if the m-part (part 102) and the c-part (part 107) match.
31. Since these two parts match (their type, style and text properties are identical), recursive-match-logic (in accordance with step 1.3.3.E) now applies get-parts-logic to the c-part (part 107) to build a list of "candidate—grandchildren" (here consisting solely of part 108).
32. Advancing to step 1.3.3.F, recursive-match-logic determines that the meaning—grandchildren list is not empty and so invokes itself, passing both the meaning—grandchildren list and the candidate—grandchildren list to the new instance of recursive-match-logic. While discussing the operation of this new instance, these two lists will be referred to as its meaning—list and candidate list.
33. The new invocation of recursive-match-logic begins at step 1.3.3.A, determining that there is only one possible pairing of parts from the two lists (since each list contains only one part). The m-part is part 103, and the c-part is part 108.
34. Proceeding with steps 1.3.3.B and 1.3.3.C, get-parts-logic is applied to the m-part (part 103) to build a meaning—grandchildren list. Since part 103 has no properties which refer to un-matched parts, this list is empty.
35. Next (1.3.3.D) match-parts-logic is invoked to determine if the m-part (part 103) and the c-part (part 108) match.
36. In this instance, match-parts-logic will identify this match as special since the text property of the m-part starts with "" (see 1.3.2.A). Match-parts-logic reports a match along with an indication that this is a special match involving "". Also in accord with 1.3.2.D, a circumstance-item is constructed and added to the current circumstances data structure (FIG. 16):

| Formal-String: | "**details" |
| --- | --- |
| Actual-String: | 0 |
| Actual-Part: | part 108 |
| Actual-Context: | C1 |

37. Recursive-match-logic (in accord with 1.3.3.E) responds to the special match condition by skipping ahead to 1.3.3.H where it is noted that the list of unmatched c-parts is empty and that all m-parts have been matched.
38. Step 1.3.3.I has no effect since the candidate—list is exhausted so, at step 1.3.3.J this instance of recursive-match-logic exits, reporting a match and returning an empty boundary-list.
39. This brings the process back to the instance of recursive-match-logic which we left at step 32, above. In returning to this previous instance, we return to the point in 1.3.3.F following the invocation of recursive-match-logic.
40. Continuing with 1.3.3.F, the returned boundary-list is saved. Step 1.3.3.G has no effect since this boundary-list is empty.
41. This instance of recursive-match-logic also moves quickly through steps 1.3.3.H and 1.3.3.I because the list of unmatched c-parts is empty and all m-parts have been matched.
42. At step 1.3.3.J, recursive-match-logic exits back to cluster-match-logic, reporting a match and returning an empty boundary-list.
43. Cluster-match-logic continues in step 1.3.1 and also exits, reporting a match. This exit returns to step 74 in FIG. 8.
44. Next, meaning analysis updates the results-pool (FIG. 15) by (1) discarding any old result-items that may be in the results-pool and (2) adding a new result-item which indicates that part 106 was matched by the meaning of FIG. 9A and which contains an empty boundary-list.
45. Meaning analysis activates the match-loop-control-logic (1.3.5) which immediately processes the new result-item by invoking a new instance of meaning analysis. This instance of meaning analysis will evaluate this definition-cluster in the light of the circumstances data structure and a new context. The circumstances data structure currently contains a circumstance-item indicating that part 103 was matched by a cluster of parts, namely parts 108–116. The new context used by this instance of meaning analysis will be C2 (because the triangle associated with this meaning has a text property of "C2" which caused C2 to be the definition-context designated for this meaning). This change in the "current" context is called a context switch. When this new instance of meaning analysis completes, the executor will return control to the previous instance of meaning analysis which will resume processing using context C1. Thus, a switch to a new context is temporary and returns to the previous context once analysis in the new context has been completed.
46. This instance of meaning analysis starts by invoking C2's first-part-logic (1.1.1) which designates the primary-part of the definition-cluster as the current candidate part (connector 104 in FIG. 9A). Meaning analysis will proceed to search C2's meanings-list for a meaning-template which matches any cluster of parts emanating from part 104.
47. As was the case in step 18 when an attempt was made to find a match for connector 105b, there is no meaning-template that successfully matched connector 104. In this case, when get-parts-logic is applied to part 104, part 117 will be the only member of the list returned. This list will become the boundary-list in new result-item that replaces the old one in the results-pool (FIG. 15). As in step 19 above, primitive-action-logic will be invoked but will take no action since part 104 has no text property. Part 117 will be copied out of the result-item's boundary-list and into the working-pool by match-loop-control-logic who returns to meaning analysis a result indicating that a new candidate part should be selected.
48. It should be clear by now that meaning analysis proceeds to invoke the next-part-logic (89, FIG. 8). In this case, the new candidate part will be the box 117. Meaning analysis once again sets out to find a successful cluster-match for the new candidate part (part 117).
49. A match will be found with the meaning A in FIG. 10.
50. The primary-part for this meaning's meaning-template is part 140 and will be found to match part 117. While the type and style properties of these two parts are identical, their text properties are not. The text property for part 117 is "appropriate subject for me?" while that for part 140 is "appropriate subject for *individual?".

51. The reason why these non-identical text properties are considered to match is to be found in the specification of match-parts-logic, in particular step 1.3.2.D. When this step is reached, the identical words in the two text properties have been found.

52. The text property of part (140) is deemed to match the text of part (117) because the word "*individual" in the meaning-template is allowed to match the word "me" in the candidate-cluster. The convention employed here is that a word beginning with a single "*" is permitted to match any corresponding portion of text in the candidate-cluster not exactly matched by surrounding words or characters. Thus, "appropriate subject for me?" and
"appropriate subject for *individual?"
are considered to match, according to logic step 1.3.2.D. Also in accord with this step, a circumstance-item will be added to the current circumstances data structure (FIG. 16) that indicates that the word "*individual" was matched by the word "me":

| Formal-String: | "*individual" |
|---|---|
| Actual-String: | "me" |
| Actual-Part: | 0 |
| Actual-Context: | C2 |

53. Once parts 140 and 117 have been matched, the cluster-match-logic will attempt to match the remaining parts in the meaning-template (141-148). It can be seen that the cluster (145,146) will match (118,120) because of the "**" at the start of the text property of part 146. Another circumstance-item will be added to current circumstances (FIG. 16) indicating that part 146 was matched by part 120:

| Formal-String: | "**NO" |
|---|---|
| Actual-String: | 0 |
| Actual-Part: | part 120 |
| Actual-Context: | C2 |

Similarly, parts 147, 148 and will match parts 119, 121, generating a circumstance-item indicating that part 148 was matched by part 121:

| Formal-String: | "**YES" |
|---|---|
| Actual-String: | 0 |
| Actual-Part: | part 121 |
| Actual-Context: | C1 |

Note that circumstance-items need not be generated for simple, literal matches such as that between part 147 and part 119.

54. The reason that parts 141-144 and 130, 129 match is a bit more complex. In this case, parts 141 and 130 match. Connectors 130-136 are all examples of connectors which are routed from source to target via a right angle at their mid-point; where the arrowhead is positioned. Since these connectors emanate from the same source part (part 129), they are each initially routed downward from their source. Thus, their downward paths overlap and don't diverge until each connector's midpoint. (These connectors could be re-drawn as separate, curved connectors. However, the routing of a connector is not a property involved in comparison in this example.) The question now is how can part 129 be considered as a match for parts 142-144? Part of the answer is that this match is valid only under present circumstances.

55. When connector 130 is matched with part 141 as part of the cluster matching process, get-parts-logic is invoked in order to form the candidates_1-ist and candidate_grandchildren lists used as part of the recursive matching process. As described in logic step 1.3.4.C, both the source and target properties of connector 130 will be examined. If the text property of the part referenced by a connector's source or target property does not begin with "" (the usual case), then this part itself is added to the list being built by get-parts-logic. However, according to step 1.3.4.C, whenever such text does start with "", additional work is performed. Connector 130's source property points at part 129 whose text property starts with "". So, at step 1.3.4.C in get-parts-logic, when part 129 is being examined to see if it should be added to the list, it will be noticed that its text starts with "" and a part-substitution will be performed.

56. Part-substitution for part 129 is performed by searching the circumstances data structure for the most recent circumstance-item whose formal-string field is "**details", the text of part 129. In this case, the circumstance-item found is the one built in step 36. As described in step 1.3.4.C, the part referenced by the actual-part field of this circumstance-item will be added to the list build by get-parts-logic instead of part 129. The substituted part is part 108. The result of this substitution is as if part 108 was connector 130's source instead of part 129. (But also note that this effect is a consequence of the current state of the circumstances data structure. If a different part had been matched back in step 36, a different part would be substituted now.)

57. So, as a result, the recursive match attempt actually continues by attempting to match clusters (142-144) and (108-116). Clearly a match-up can be made: 142 & 108, 143 & 113 and 144 & 114. An additional circumstance-item will also be added to the current circumstances data structure as a result of the match-up of parts 144 & 114:

| Formal-String: | "*subject" |
|---|---|
| Actual-String: | "draft-product-spec" |
| Actual-Part: | 0 |
| Actual-Context: | C1 |

58. The remainder of this successful match will be conducted as before, finally causing another instance of the meaning analysis process to be created in order to evaluate the definition-cluster (whose primary part is part 149) that is associated with the meaning given in FIG. 10 (meaning A). (Note that this new instance of meaning analysis will operate in context C1 because the text property of the meaning triangle is "C1". Once this instance of meaning analysis has finished, control will be returned to the previous instance which was operating in context C2.)

59. At this point, it should be clear how the matching process operates and adds circumstance-items to the circumstances data structure for the various kinds of matches that can occur involving text properties containing words starting with "*" and "**". Relying on this understanding, it can be seen that connector 149 will have no effect other than to bring us to box 150 and the cluster (150–156).

60. This cluster will match the meaning-template shown in FIG. 11A as parts (160–166). The pairing of parts 150 and 160 in this match illustrates the handling of a single "*" in a text property within a candidate-cluster. As in the case of "**", a substitution is made but it is a textual substitution, not a part substitution. Since the circumstances data structure contains a circumstance-item which indicates a correspondence between the formal-string "*subject" and the actual-string "draft-product-spec", the appearance of the string "*subject" in the text of part 150 is replaced by "draft-product-spec". This, in turn, gets associated with the text "*subject" where it appears in part 160. This match-up will lead to the generation of another circumstance-item:

| Formal-String: | "*subject" |
| --- | --- |
| Actual-String: | "draft-product-spec" |
| Actual-Part: | 0 |
| Actual-Context: | C1 |

The net effect of this is that the original string "draft-product-spec" from part 114 is propagated through a correspondence with the string "*subject" as it appears in part 144 and then part 150 and later in part 160. (Note that the original Actual-Context field is maintained despite the fact that meaning analysis has switched from context C1 to context C2 and then back again.)

61. After parts 150 and 160 are matched, cluster-match-logic will generate a candidates_list consisting of parts 151, 153 and 154 and a meanings_list consisting of parts 161, 163 and 165 which will be given to recursive-match-logic to see if matches for all the parts in the meanings_list can be found. The logic flow through recursive-match-logic has been described before. But considering the handling of part 151, for instance, it will be found to match-up only with part 163. This will cause a new instance of recursive-match-logic to be activated on a candidates_list consisting only of part 152 and a meanings_list consisting only of part 164. When match-text-logic is applied to these parts, it will recognize that both the m-part and c-part have text properties which start with "**". As described in logic step 1.3.2.A, a new circumstance-item will be constructed in which the "actual-" fields are copied over from the circumstance-item built in step 53. The new circumstance-item will be:

| Formal-String: | "**YES" |
| --- | --- |
| Actual-String: | 0 |
| Actual-Part: | part 121 |
| Actual-Context: | C2 |

This instance of recursive-match-logic will quit and return to the previous one which will continue by attempting to match-up the remaining parts (parts 161 and 165 on the meanings side, and parts 153 and 154 on the candidate side). Matches will be found here as well. Parts 153 and 161 will match, adding nothing to current circumstances, but causing another invocation of recursive-match-logic to examine 155 and 162. These will match in the same way as parts 151 and 163. The following circumstance-item will result:

| Formal-String: | "**NO" |
| --- | --- |
| Actual-String: | 0 |
| Actual-Part: | part 120 |
| Actual-Context: | C1 |

Similarly, parts 154 and 165 will match, leading to a match between parts 156 and 166. This last match will produce the following circumstance-item:

| Formal-String: | "*item" |
| --- | --- |
| Actual-String: | "me" |
| Actual-Part: | 0 |
| Actual-Context: | C1 |

62. After a new instance of meaning analysis is applied to part 168 and it is found that there is no meaning that matches, primitive-action-logic is then applied to this part.

63. The primitive-action-logic chosen for this example is very simple in operation. The text property of the part being processed is examined, word-by-word. (Here a word is any group of characters not including a space.) If a word does not start with a "*", it is simply copied to the output file. If a word starts with a "*", the current circumstances are searched for the most recent circumstance-item whose formal-string field matches the word. If the circumstance-item so found has a non-zero actual-string field, a string substitution is performed by copying the actual-string into the output file in place of the word. This sort of action execution, applied to part 168, results in the following output:
if (draft-product-spec reasonable for me) { in which the string "*subject" has been replaced by "draft-product-spec" and the string "*item" has been replaced by "me".

64. Since the character "{" of the text property of part 168 is followed by the word "YES", primitive-action-logic will search for the most recent circumstance-item whose formal-string is "YES". Since, the actual-string field of this item is zero, and the actual-part field of the circumstance-item is non-zero, the part referenced by the actual-part field is subjected to meaning analysis. In this case, it is part 121. Further processing of part 168 is suspended while part 121 is fully processed. A new instance of meaning analysis is created and part 121 is treated as the primary-part of a definition-cluster to be evaluated in the context specified by the actual-context field of the circumstance-item (in this case, context C2). In this case, the result is the processing of the remainder of FIG. 9A that flows from part 121. Whatever output is to be generated as a result of this new instance of meaning analysis will appear in the output file at this point. (This is discussed more fully in step 65, below.)

Once this part (and surrounding clusters) has been fully processed, this new meaning analysis instance concludes and returns to the one whose processing of part 168 was suspended. Any additional circumstance-items created during meaning analysis of part 121 are deleted from the circumstances data structure when this instance terminates. Primitive-action-logic's processing of part 168 will continue with what follows the word "**YES", giving:

```
                    }
                    else {
``` followed by any output resulting from the word "NO" which, in turn, is followed by a closing "}". When the word "NO" is evaluated, the circumstances data structure will be the same as it was when "YES" was evaluated (since any items added during "YES" evaluation would have been removed). The evaluation of "**NO" and the closing "}" will actually produce the last lines of output generated by this example (see the full output listing following step 69).

65. But returning to the processing of "YES" in part 168, the cluster at 121 will be evaluated in context C2 and will, therefore, be matched by the meaning-template at part 170 in FIG. 10. (Note that there would be no match for part 121** if it were evaluated in context C1). The word "*participants" in this cluster will be associated with the string "the planning group" (which appears as the text property of part 110 in FIG. 9B). Similarly, the word "*subject" will again be associated with "draft-product-spec".

66. The definition-cluster shown in FIG. 10 (meaning B) will be evaluated in context C1. (Note the text property of the triangle.) When the cluster at 171 is evaluated, it will not be matched by the meaning-template at 160 because of the different directional orientation of parts 165 and 172.

67. Looking more closely, it is observed that this means that part 171 has two source-of properties (referencing parts 173 and 174) and a target-of property that references part 172 while part 160 has three source-of properties (referencing parts 161, 163 and 165).

68. So, even though their other properties match, these differences are enough to prevent parts 171 and 160 being considered as a match. Since these do not match, other matches will be attempted. Ultimately, it will be found that the candidate-cluster at part 171 does match the meaning-template at part 180) in FIG. 11B.

69. The definition-cluster starting at 181 will then be evaluated. Meaning analysis is applied to this cluster and various matches will be made with meaning-templates appearing in FIG. 12A–E. It is worth noting that when part 182 becomes the candidate-part, it will be matched by part 160 instead of part 180 because of the direction of the dashed-connector.

Output

The following is the output code generated by the invention as a result of processing the diagrams in the set of FIGS. 9A through 12E:

```
start
if (draft-product-spec reasonable for me) {
    make temporary lists {
        appropriate-list ;
        inappropriate-list };
    while ( the planning group has more individual s) {
        examine next individual ;
        if ( draft-product-spec reasonable for individual ) {
            put this particular individual
                at the end of the " appropriate-list ";
        }
        else {
            put this particular individual
                at the end of the " inappropriate-list ";
        }
    }
    if ( appropriate-list matches the planning group ) {
        if (time and place are ok) {
            accept request
        }
        else {
            propose alternate time and place.
        }
    }
    else {
        propose alternate participants.
    }
}
else {
    decline request
}
```

This output takes a form familiar to many computer software professionals: a highly-readable, pseudo-code patterned after a popular programming language called C. Since similar textual forms are routinely used to define programs which can be executed on general purpose computer systems, this form of output is taken to be, in effect, equivalent to machine execution. The primary difference between such pseudo-code actual source code in the C language is a line such as:

```
if ( draft-product-spec reasonable for me ) {
might appear as:
if (reasonable("draft-product-spec", "me") {
```

This latter would be appropriate given that elsewhere in the program a boolean function named "reasonable " is defined to accept two string arguments. The job of such a function would be to search a database (or a similar collection of data) for a correspondence between a subject whose name matched the first string and an individual whose name can be deduced from the second string and to return a boolean result of TRUE if such a correspondence is found or a boolean result of FALSE if it is not. The effect of this line in the program would thus be to perform a conditional branch based on whether or not the function reasonable returned a TRUE or a FALSE result. The point of using pseudo-code is to avoid the lengthy and tedious presentation of details whose construction can be reasonably considered to be feasible and whose function can be expressed in a short phrase.

In summary then: (1) since it is known that the machine-language form of a program is executable on suitable hardware, and (2) it is known that the source-language form of a program can be converted into a machine-language form, and (3) this example illustrates that the source-language form of a program could be generated from a set of diagrams, therefore (4) this example illustrates a method of executing a set of diagrams.

So far, this example has served to illustrate the operation of the basic mechanisms of the invention. A further point is to demonstrate how systems built along these lines may be altered or adapted in ways not easily done using conventional techniques.

Figure 13:
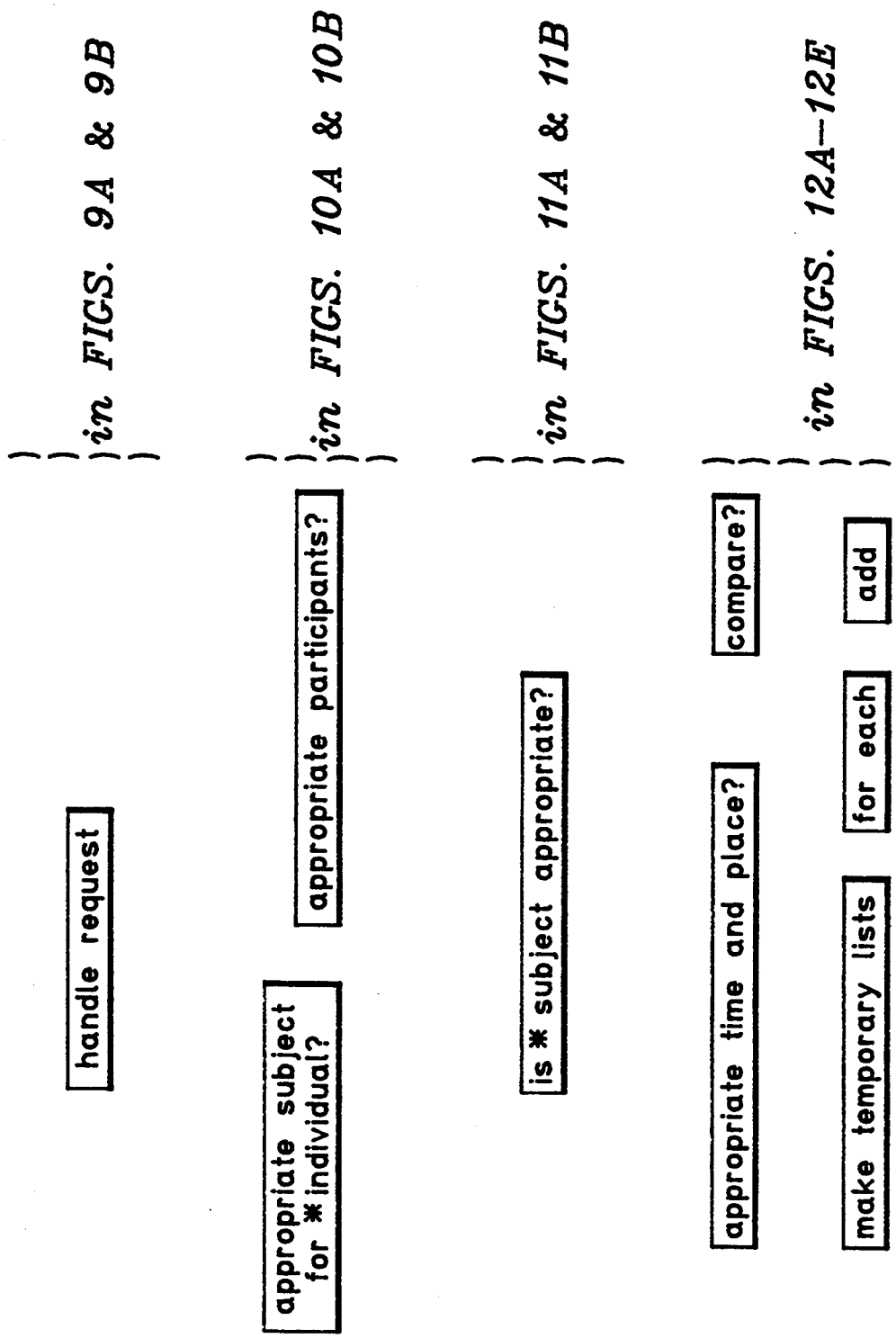

The FIGS. 9A through 12E have some additional characteristics. FIGS. 9A and B express, at the highest level, the desired behavior of the system. FIG. 9A represents the highest level of meaning given to the concept "handle a request for a meeting". (FIG. 9B should be seen only as test-case used to explore the operation of the meaning in FIG. 9A for the purposes of this example.) The diagrams shown in FIG. 10 are transition diagrams, referenced from FIG. 9A above and making references to meanings below them in FIGS. 11A through 12E which represent the lower-level meanings or concepts in the system. This hierarchial view can be seen in FIG. 13 which shows only the primary-parts of the meaning-templates which appear in each of the previous figures. This layering of the levels-of-abstraction in a system is typical of modern-day systems design.

What is of interest is the situation in which it is desired to alter such a hierarchial system. The logical flow captured in FIG. 9A, in combination with the meanings given in FIG. 10, has the characteristic of causing a request to be immediately declined as soon as the subject is judged not appropriate. Consider the user who would like to give consideration to the meeting participants prior to declining a request. As always, there are many ways in which the system could be modified to meet this new requirement. An approach that is uniquely supported by the invention is the following:

The definition-cluster given in FIG. 9A could have different significance if evaluated in a different context. The evaluation context is determined by the text property of the meaning-triangle, part 103b. If the text in this triangle was changed to "C3", the meanings given in FIG. 10 would not be involved (since these meanings only appear in the meanings-list of context C2). Instead, the meaning given in FIG. 14 would be considered because it is on the meanings-list of context C3. The meaning-template starting with part 190 has been constructed so that it will match a larger candidate-cluster around part 117 in FIG. 9A. Specifically, FIG. 14 will do in one match what FIG. 10 did in two. Note that both parts 117 and 121 will be included in the new match: part 117 will pair with 190 and part 121 will pair with 191. Once this match has been made, the definition-cluster in FIG. 14 will be evaluated and meanings in FIGS. 11A and B and 12A-E will be activated.

The following is the output generated as a result of processing the diagrams in FIGS. 9A and B, 14, and 11A through 12E according to the invention:

```
start
if (my boss is in " the planning group ") {
    if (time and place are ok) {
        accept request
    }
    else {
        propose alternate time and place.
    }
}
else {
    make temporary lists {
        appropriate-list ;
        inappropriate-list };
```

```
while ( the planning group has more individual s) {
    examine next individual ;
    if ( draft-product-spec reasonable for individual ) {
        put this particular individual
            at the end of the " appropriate-list ";
    }
    else {
        put this particular individual
            at the end of the " inappropriate-list ";
    }
}
if ( appropriate-list matches the planning group ) {
    if (time and place are ok) {
        accept request }
    else {
        propose alternate time and place. }
}
else {
    decline request
}
```

In the first case, the case involving FIGS. 9A through 12E, the cluster of parts (117–121, and 129–132) were interpreted as two distinct operations, one following the other: "appropriate subject for me?" and "appropriate participants?".

Figure 14:
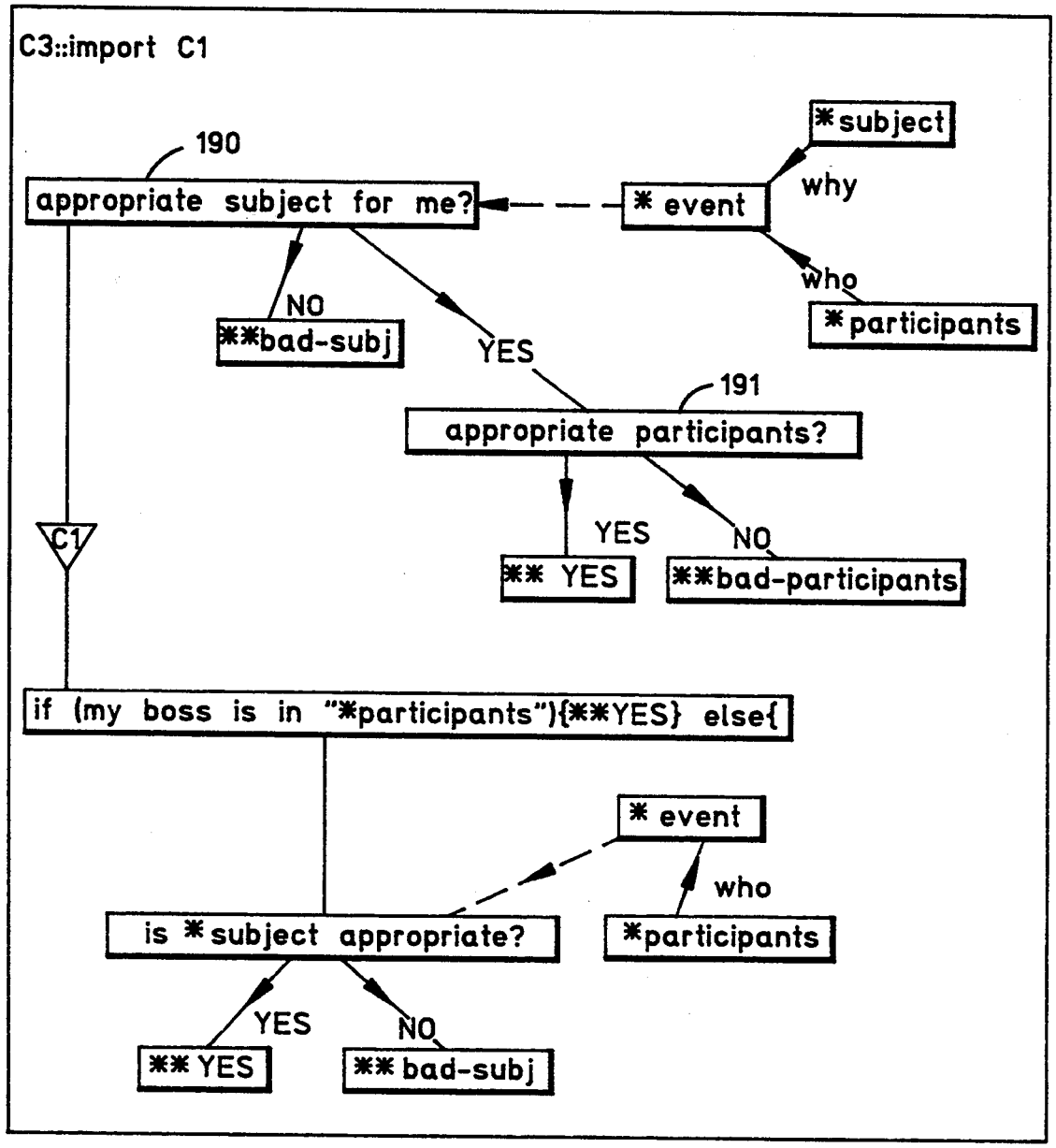

In the second case, in which FIG. 10 was replaced by FIG. 14, essentially the same cluster of parts (117–121, and 129–131) was interpreted as a single operation, whose meaning was then free to diverge totally from the significance of the meanings used in FIGS. 10 A and B. In particular, the definition-cluster in FIG. 14 makes reference to "*participants" before referencing the "*subject".

Logic Descriptions

Following are descriptions of meaning analysis logic components as needed to execute the example discussed above. Each description includes a narrative step-through of the logic function; most descriptions are followed by a code illustration of the logic or a reference to an appendix containing a code illustration.

1.1 Part-Selection-Logic 1.1.1. First-part-logic: If activated for the first time, search the diagram-set for a part whose text is "start" and identify this part as the first-part. Otherwise a definition-cluster is being evaluated, so identify the primary-part of the definition-cluster as the first-part.

```
if meaning_pointer is null then /* first-time */
    result = find("start", BE);
else result =
    meaning_pointer.definition_cluster.primary_part;
    return result;
```

1.1.2. Next-part-logic: take a part from the working-pool. If the part is a dashed-connector, ignore it and take another part from the working-pool. Once a box or a solid-connector has been taken, see if the part has previously been matched in this instance of meaning analysis. If the part has already been matched, ignore it and take another part from the working-pool. Once a part has been taken which has not yet been matched, identify this part as the next-part. If the working-pool is exhausted before a next-part can be identified, conclude this instance of the meaning analysis process.

```
loop {
    if working_pool is empty then terminate MA_process;
    candidate_part = remove(working_pool);
    if candidate_part is in
        this_context.already_matched_list then
        continue; /* loop back to try another part */
until (candidate_part.style is solid or
    candidate_part.type is box);
return candidate_part;
```

1.2 Meaning-Selection-Logic 1.2.1. First-meaning-logic: identify as first-meaning the first item in the simple list structure that is the context's meanings-list. Make use of a location in working storage that can be used to advance through the current meanings-list. This location must be able to record the last item in the list that has been referenced by meaning-selection-logic while processing this candidate-part in this instance of meaning analysis. Initialize this location to refer to the first meaning in the list.

```
this_context.curr_meaning =
    head_of(this_context.meanings_list);
```

1.2.2. Next-meaning-logic: identify as next-meaning the item in the meanings-list which follows the one identified by the location created above. Update this location.

```
this_context.curr_meaning =
    this_context.curr_meaning.next_meaning;
```

1.3 Cluster-Match-Loop-Logic 1.3.1. Cluster-match-logic: This logic is given a reference to the primary-part of a meaning-template and a reference to the current candidate-part. Invoke the match-parts-logic to check for a match between the meaning and candidate parts in the current context. If these two parts do NOT match, invoke the get-parts-logic on the candidate part and return the resulting boundary-list along with a report that no match exists. If these parts match, invoke the get-parts-logic to build a "candidate_l-ist" consisting of parts referenced by the candidate, excluding parts previously matched in this instance of meaning analysis. Mark the meaning and candidate parts as already-matched in this instance of meaning analysis. Invoke the get-parts-logic to build a "meanings_list" consisting of parts referenced by the meaning part. Invoke the recursive-match-logic to see if each part in the meanings_list has a corresponding part in the candidate_list. If the recursive-match-logic reports a match, exit and report a MATCH and return a "boundary_list" of un-matched parts. If a match is not indicated, exit and report NO MATCH. Appendix A contains a pseudo-code representation for cluster-match-logic.

1.3.2. Match-parts-logic: compare the properties of two parts and report if they match. The part from the candidate-cluster will be referred to as the "c-part" and the part from the meaning-template will be referred to as the "m-part". Two parts match if (1) their type and style properties are the same, (2) their directional characteristics are the same and (3) their text properties can be said to match. While parts (in this example) don't have directional properties, their directional characteristics are considered the same if the parts are boxes or when the parts are connectors with the same source/target orientation. The following procedure is used to determine if two text properties match:

A. The text property of the m-part is examined to see if it starts with "**" (double asterisks). If it does not, proceed with step B. If the text of the m-part does start with two "*"s, the text properties are considered to match and a circumstance-item is constructed and added to the current circumstances. Before this new circumstance-item can be built, it is determined whether or not the text of the c-part starts with a "*". If so, the circumstances data structure is searched for the most recent circumstance-item whose formal-string field matches the text property of the c-part. The actual-string, actual-part and actual-context fields of this circumstance-item are copied into the corresponding fields in the new circumstance-item. The formal-string field of this new item is then set equal to the text property of the m-part. In addition, this match is marked as a special-case match and match-parts-logic returns control to the logic element which activated it.

B. (Performed only if the text of the m-part does not start with "**") the text property of the c-part is copied into an area of working storage and named the "candidate string". Similarly, the text property of the m-part is copied into an area of working storage and named the "meaning string". If these two are identical, they match;

C. If there are words in the candidate string which start with "*" each such word must be replace by a string of substitute-text. The current circumstances are searched for the most recent circumstance-item which contains the word in question. If no such item is found, a textual match is not possible. If such an item is found, the text string stored in this item replaces the word in the candidate string.

D. Once the substitution of words beginning with "*" in the candidate string has been completed, a match is considered to exist if the strings are identical except for words in the candidate string which can be matched with words in the meaning string starting with "*". Note that when such associations are made, any number of words in the candidate string may be associated with a single word (starting with "*") in the meaning string. For each such association made, a circumstance-item is constructed. Every circumstance-item has the following structure:

| | |
|---|---|
| Formal-String: | <the text of the meaning token> |
| Actual-String: | <the associated string, if any> |
| Actual-Part: | <the associated part, if any> |
| Actual-Context: | <the context in which the match occurred> |

When the meaning token starts with a single "*", a string association is made and the actual-string field of the circumstance-item contains the matching string from the c-part and the actual-part field is empty. When the meaning token starts with a double "*", a part association is made and the actual-part field of the circumstance-item contains a pointer to the matching c-part and the actual-string field is empty. Appendix B contains a pseudo-code representation for match-parts-logic.

1.3.3. Recursive-match-logic: compares a meanings_list with a candidate_list as follows:
  A. examine each possible pairing of an m-part from the meanings_list and a c-part from the candidate list.
  B. for each paring proceed with step C.
  C. apply the get-parts-logic to the m-part to build a list of "meaning_grandchildren",
  D. invoke match-parts-logic on the m-part and c-part to see if they match,
  E. if they DO NOT match, put the c-part on a list of unmatched c-parts, pick another c-part and continue with step D. (If all c-parts have been examined, a match is not possible—exit this invocation of recursive-match-logic, reporting NO MATCH). If step D resulted in a special match, continue processing with step H. Otherwise, step D must have resulted in an ordinary match, so apply the get-parts-logic to the c-part in order to build a list of "candidate_grandchildren".
  F. if the list of meaning_grandchildren is not empty, invoke the recursive-match-logic on the meaning_grandchildren and candidate_grandchildren lists and save the boundary_list that was generated. If the list of meaning_grandchildren is empty, apply the get-parts-logic to the c-part in order to build a boundary_list. Exclude dashed-connectors from this list.
  G. add any parts in the boundary_list build in step F to the result_list being maintained for this invocation of the recursive-match-logic.
  H. move all parts in the list of unmatched c-parts back onto the candidate_list (this will allow them to be paired with other parts from the meanings_list). Advance to the next pair of m-parts and c-parts, and continue with step C. When all m-parts have been matched, continue with step I.
  I. add any c-parts that remain on the candidate_list to the result_list except for: (i) any dashed-connectors or (ii) solid-connectors whose target property references a part in the candidate-cluster explored so far.
  J. exit, report a MATCH, and return the result_list as the boundary_list computed by this invocation of recursive-match-logic. Appendix C contains a pseudo-code representation for Recursive-match-logic.

1.3.4. Get-parts-logic: build a list of parts which are referenced by a given part, subject to given constraints. The list is built via the following procedure:
  A. loop through the properties of the given part.
  B. for each source-of or target-of property, examine the referenced connector. If it is a solid-connector or if the given constraints permit any style of connector, then add this connector to the list.
  C. for each source or target property, examine the referenced part. If the given constraints permit, examine the text property of the part. If the text starts with a word that begins with two "*"s, search the current circumstances for the most recent circumstance-item containing this word. Add to the list the part that is associated with this word in the circumstance-item (this how a part-substitution is performed). If the text does not start with two "*"s, add the part to the list.
  D. examine each part that has been added to the list and eliminate any part which has already been matched in this instance of meaning analysis.
  E. exit, returning the list as the result of the get-parts-logic. Appendix D contains a pseudo-code representation for Get-parts-logic.

1.3.5. Match-loop-control-logic: process a new result-item each time through the cluster-match-loop. There are two cases: (1) when the result-item indicates failure, and (2) when the result-item indicates success. In the first case, when the result-item indicates failure, the next-meaning-logic is activated to see if there are more matches to be attempted. If another meaning is found, match-loop-control-logic returns to meaning analysis. If all meanings have been tried and no match has been found, activate the primitive-action-logic for the candidate-part. Once the primitive-action-logic has finished, it returns to match-loop-control-logic who copies the boundary-list from the result-item into the working-pool (doing this in a way which ensures that there are no duplicates). Finally, all circumstance-items built during the unsuccessful match attempt are discarded, and the match-loop-control-logic returns to meaning analysis with an indication that all meanings have been examined. If, in the second case, a result-item indicates success, the definition-cluster associated with the matched meaning will be immediately analyzed by a new instance of meaning analysis. Once this separate instance of meaning analysis has concluded, it returns here to match-loop-control-logic who now (1) copies the boundary-list from the result-item into the working-pool (ensuring no duplicates), (2) discards all circumstance-items built during the (successful) match just processed, (3) marks the current candidate part as having been matched in this instance of meaning analysis and (4) returns to meaning analysis with an indication that the match-loop is finished with the current candidate-part.

1.4 Primitive-Action-Logic

The text property of the part subjected to primitive-action-logic is examined, word-by-word. If a word does not start with a "*", it is simply copied to an output file If a word starts with a "*" the circumstances data structure is accessed for information associated with the word. If there is only one "*" at the start of the word, a textual substitution is made and the substitute text is copied to the output file. If the word begins with "", the part associated with the word (via a circumstance-item stored in the current circumstances) is subjected to meaning analysis. Once this part has been fully processed, the primitive-action-logic continues processing with the word following the one beginning with "".

Best Mode

The best mode of the invention is executed on a commercially available IBM/PC-compatible microcomputer and makes use of the following commercially available software products:
1. The "Microsoft MS-DOS" operating system, version 3.3 from Microsoft Corporation, One Microsoft Way, Redmond, Wash. 98052-6399.
2. The Microsoft Windows graphical Environment, version 3.0, also available from Microsoft Corp.

3. The "Microsoft System Development Kit for Windows"; also from Microsoft.
4. "Borland C++" and its associated windows libraries, object files, and Dynamic Link Libraries (DLLs) from Borland International, Inc., 1800 Green Hills Road, Scotts Valley, Calif. 95067-0001.
5. The "TIER C++ Class Library for MS-Windows" and its associated object files and DLLs from Sturmer Hauss Corp. 685 W. Long St., Stephenville, Tex. 76401.

System Decomposition into "Files"

Clearly, systems constructed according to the invention have the potential to incorporate a very large number of individual parts. As a practical expedient, the current embodiment allows the collection of parts which make up a single system to be decomposed into a number of individual "files" (as defined by the MS-DOS operating system). The most fundamental type of file used by the prototype is known as a "rendition" or "rendition file". A rendition file is a collection of individual parts. Concurrently, the embodiment's diagram editor (also called the "rendition editor") permits only one file at a time to be edited. Another type of file known as a "library file" can be used to group together one or more other files in order to provide for more convenient file management. A library file can make reference to other library files as well as to rendition files. At the basic conceptual level, the decomposition of a large system into separate library and rendition files has little significance other than to limit the scope of diagram editing and to impose a restriction on the specification of contexts. This restriction has to do with the way that contexts other than the default context are diagrammatically defined. In the current embodiment, a default (or global) context is presumed to exist despite the fact that the user has not constructed a part to represent the default context. This context represents a special case because, in effect, every other part in a system is considered to be encompassed by this default context. The diagram editor permits the user to create additional contexts by drawing a solid, bold rectangular box. Meaning triangles placed within such a solid, bold box are deemed to be meanings contained within the context associated with the box. This approach has the effect of limiting all contexts other than the default context, to the file in which the box that represents the context appears. This limitation is largely mitigated by the "::import" facility that was described in the example. This facility makes use of the text property of a context (or rather the solid, bold box that represents a context) to specify:

1. A Name: which is the textual identifier associated with the context; and
2. An Import-List: which is a list of the identifiers of other contexts whose meaning-lists are to be added to this context's meaning-list.

An alternate means of specifying a context-switch

The example has described a means of specifying the definition-context component for a meaning. In the example, the text property of the meaning-triangle is used to specify the name of the context that is to be used as the definition-context. The sole purpose of a meaning's definition-context component is to identify the context that will be used by the meaning analysis procedure when evaluating the individual parts which make up the definition-cluster. The definition-context field is one way to provide the system with the ability to perform a "context-switch". Using this method, a context-switch is permitted whenever a new instance of the meaning analysis process is created. An alternative, and somewhat more general, method of providing the ability to change contexts can be achieved by adding this capability to one or more of the primitive-action-logic components used within a system. The existing embodiment uses such a technique. Specifically, the primitive-action-logic component of every context can recognize a text property of "::set_context". Whenever primitive-action-logic is applied to a part whose text property equals "::set_context" the system will switch to the smallest context which encloses this part. Note that only contexts which occur in the same file as the ::set_context part are considered here. If a ::set_context is encountered for which no explicitly enclosing context can be found, the global (or default) context is selected and a switch to this context occurs. One consequence of this approach is that the definition-context field of the meaning data structure is not required. Instead, the job of specifying a new context is left to the definition-cluster itself. While this is more burdensome and tedious to describe, it might be considered more flexible because it permits a single definition-cluster to switch to more than one context in the course of its evaluation.

Optimization: Storing Match Information

There are many opportunities to apply techniques which are well-known to computer science and whose application can result in significant improvements in the operational efficiency of the invention. One class of improvement involves generating supplemental information during the meaning analysis process and storing it for later use. An example of this class of improvement is implemented in the current embodiment. The basic approach is to store extra information with each part that has been evaluated as "current candidate-part" and subjected to cluster matching. This extra information is stored in such a way that it can be retrieved the next time the part becomes the current candidate-part. The information is then used to eliminate or reduce the search-time associated with finding the meaning or meanings which can be said to match this candidate-part. The embodiment calculates this information when it has finished processing a given candidate-part. It stores with this part additional properties which indicate whether or not a match occurred and, if so, what meaning was matched and in what context. The next time this part becomes the current candidate-part, these properties are accessed by the meaning analysis process prior to entering the match-loop and, in many cases, can be used to eliminate (or at least reduce) the cluster-matching that would otherwise need to occur. There are a variety of sophisticated compiler optimization techniques, for example, which can be readily applied to the invention.

Optimization: Storing Primitive-Action Information

Another type of optimization is based on the observation that systems will often be constructed in such a way that there are certain candidate-clusters which are repeatedly evaluated in the same context and in light of the same circumstances. There is a certain degree of processing required to discover all of the primitive-actions which will be executed as a result of a full meaning analysis of a given candidate-cluster. There are cases in which it is possible to avoid repetitive meaning analysis processing by storing a representation of the sequence of primitive-actions which result from a previous analysis. Such cases would be recognizable to an experienced compiler writer. In general, a sequence of primitive-actions can be stored as a property of the primary part of the candidate-cluster which generated that sequence. The next time this part becomes the current candidate-part, this sequence of primitive-actions can be executed instead of repeating the full meaning analysis. This should be thought of as an optimization because its purpose is not to alter the flow of primitive-actions performed by a system, but, rather to eliminate unnecessary and time-consuming processing. It should be noted that proper implementation of this optimization is not as easy as it sounds because, for example, it is possible that a match between a given candidate-cluster and a given meaning-template might depend upon the state of the circumstances data structure at the time that the match occurs. If this were to be the case, the sequence of stored primitive-actions might not be valid for a later match that took place under different conditions. A catalog of "match-dependencies" can be constructed by carefully considering the various situations under which circumstance-items are constructed and exactly how they contribute to a successful match. Given such a catalog for any particular implementation, one can analyze any particular match and determine its specific dependencies. The building of such "dependency graphs" is familiar to compiler writers. In many cases, it may be less costly to test for such dependencies than to unconditionally re-attempt the match. If the conditions upon which a previous match depended still exist, then the previously executed primitive-actions can be re-executed. If conditions have changed, it may be possible to appropriately modify the list of previously executed primitive-actions or it may be necessary to reattempt the match.

Optimization: Storing Version Information

The existing embodiment keeps track of a "version number" for each part, file and reference. This version information facilitates the implementation of the optimizations discussed above. When certain changes occur in a part, for example, its version number is increased. This permits the system to notice during later processing that a reference exists to a previous version of a part. When such an outdated reference is noted, the system can follow the appropriate dependency relationships and update stored relationships as may be necessary as a consequence of a particular change.

Diagram Editor

The example makes use of a specialized diagram editor. This editor is a Microsoft Windows application and is built in Borland C++ using the associated windows libraries, objects, and dynamic link libraries (DLLs) along with the TIER C++ class library, objects and DLLs for Windows and the Microsoft System Development Kit for Windows. The basic framework for this application can be derived from the example overlapped windows provided with the TIER system or one could also create the application framework utilizing a text such as "Programming Windows: the Microsoft Guide to Writing Applications for Windows 3" by Charles Petzold. Like the examples provided in these products, the editor takes advantage of the capabilities that Microsoft Windows system affords. Microsoft Windows monitors both the mouse and keyboard devices (Windows can monitor many different input and output devices, these two devices are used as examples). When Windows determines that the user has made a request by interacting with either of these devices, the Windows system will inform the diagram editor. Windows can also make specific system requests.

The diagram editor operates on the messages or requests that are made of it. A user driver request might be to create a part, to create a relationship between two parts or to store the representation of an entire diagram on disk. In the following descriptions, Appendix E Diagram Editor Pseudo Code is referenced by line number. Note that like the pseudo code, the terms shape and part are used interchangeably. Using rectangular part creation as an example, this is how the system would behave:

1. The user types the character "R" on the keyboard.
2. The Windows system notices a keystroke event and sends a message to the diagram editor informing the editor of the event (character "R" has been struck).
3. The editor's message loop receives the WM_KEYUP message for an "R" and passes the information to its function Interp_Keystroke (lines 404–406). Interp_Keystroke would then post a message to the message loop instructing the message loop to prepare for the creation of a rectangle (lines 873–879). The message loop processes this information by changing the editor's state variable to State_Start_Create_Rectangle (lines 450–452).
4. The user positions the mouse cursor where he wants the left upper corner of the rectangle to be and then presses the left mouse button down.
5. The Windows system notices a mouse event and sends a message to the diagram editor informing the editor of the event (left mouse button down at a particular coordinate on the screen).
6. The message loop receives the WM_LBUTTONDOWN message at the particular coordinate of the mouse down and passes the information to its function Interp_Left_Click (lines 412–414). Due to the state of the editor, start the creation of a rectangle, Interp_Left_Click will send the message loop an ID_RECTANGLE_CR message with the current mouse position (lines 795–798). The message loop will allocate a new rectangle object in memory—this will call the rectangle's constructor which will initialize the rectangle's draw pens, the shape tag, the file and shape handles, the center, left upper and right lower points and the context flag (lines 201–205)—set the state to State_Create_Rectangle and set the current shape to the newly allocated rectangle (lines 454–476).
7. The user drags the mouse cursor to where he wants the right lower corner of the rectangle to be.
8. The Windows system notices a mouse event and sends a message to the diagram editor informing the editor of the event (mouse movement across the screen).
9. The message loop receives the WM_MOUSEMOVE message at the particular coordinate of the mouse move and passes the information to its function Interp_Mouse_Move (lines 420–422). Interp_Mouse_Move will send the message loop an ID_RECTANGLE_CR with the new mouse position (lines 701–703). The message loop will adjust the right lower corner of the rectangle with a call to Move_To (lines 454–476). Move_To will erase the current image that is displayed, adjust the center, left upper and right lower points appropriately, redraw the image on the screen and notify any properties that might be affected by the movement (lines 223-225).
10. The user may continue to drag the mouse, in which case steps 7, 8, and 9 will be repeated until the user releases the left mouse button—step 11.
11. The user releases the mouse left button at the final position of the right lower corner (note the right lower corner may truly be any corner of the rectangle in the diagram, the two point names are chosen to aid in the visualization of the rectangle).
12. The Windows system notices a mouse event and sends a message to the diagram editor informing the editor of the event (left mouse button up).
13. The message loop receives the WM_LBUTTONUP message at the particular coordinate of the mouse up and passes the information to its function Interp-Left_Up (lines 424-426). Due to the state of the editor, create a rectangle, Interp_Left_Up will send the message loop an ID__RECTANGLE_CR message with the current mouse position (lines 672-673). The message loop will adjust the rectangle as described in step 9 (lines 454-476). Upon return from the sent message, Interp_Left_Up will add the new rectangle to the library and update the editors state to shape selected (lines 674-676). The Add_Ref function will actually place this new rectangle in the display list of the appropriate file record, add any new properties to the property list of the appropriate file record, assign appropriate persistent file and shape handles to the shape and will make sure that any necessary property manipulations required by the addition of the new shape are performed (lines 259-261).
14. The editor will then wait in shape selected state for further messages to be sent to its message loop.

From this process, one can see how a triangle would be created. The primary difference lies in the fact that three points must be selected (lines 201-206, 226-227, 477-503, 800-814 and 884-889). Connector creation is also quite similar to rectangle creation, but instead of selecting one corner location and dragging to the second location, the user simply left clicks on first the source shape and then the target shape (lines 505-532, 781-793 and 854-860). The constructor for the connector calls the base constructor just like other shapes, but it is different from the other shapes in that the connector itself does not determine its graphical end points, the source and the target shape positions force that choice. The constructor for the connector takes the source and target shapes as parameters (line 207). With this information, the constructor will assign these shapes to the appropriate member components, assign the default value to the directional component (TRUE), assign the default value to the point count component (2) and use the default pen (assigned in the shape base class constructor) to create a line image with a directional indicator from the center of the source shape to the center of the target shape. With the ability to create all of the shapes in memory and display them on the screen, it becomes clear that modifications will be required to these shapes to support meaningful diagrams. Operations such as associating text with a shape—accepting text from the user and then associating this text with the selected shape (lines 635-640 and 867-872)—and modifying the source or target of a connector—allowing the user to use the mouse to select a new source or target, updating the appropriate source/target component and connection properties and then erasing the old connection and drawing the new connection (lines 232-237, 562-582, and 771-793)—support this effort. There are other modifications that can be made, shape sizing and movement, as examples, that are clearly described in the pseudo code.

Once a meaningful set of diagrams has been created in memory, it is only practical that the structures representing the diagrams would be written and then eventually read from disk (lines 332-341). To perform this operation, the data must be transformed from a memory representation to a disk representation. All of the disk shape, diagram (rendition file) and library data is represented in a format that encapsulates the memory structures. The primary difference lies in the references to properties and to other shapes. Instead of referencing a shape's machine address, a property or shape will reference the persistent handle pair (file handle, shape handle). With each shape disk reference, there is also a version number stored to assist in the maintenance and correctness of shapes and properties. Another difference is that a shape's property list is not stored explicitly with the shape. Instead, each property is stored with persistent references to its associated shapes. Thus, the property list of any shape can be built as each file is read into memory. Since every shape and property is stored with the appropriate rendition file, there is no difficulty in recreating the appropriate library/file associations. With the capability of storing and retrieving all pertinent diagram data, the editor can be used to support a host of tools operating on the robust diagram data.

While a preferred embodiment of the invention is described, it should be understood that modifications and adaptations thereof will occur to persons skilled in the art. Therefore, the protection afforded the invention should only be limited in accordance with the scope of the following claims.

APPENDIX A SECTION 1.3.1 PSEUDO CODE

```
ClusterMatch(Meaning, Candidate)           // Match_Meaning
{ Candidates_List = Match_Parts(Meaning, Candidate);
  if Candidates_List is null then          // no match if no list.
     return NO_MATCH & boundary_list = Get_Parts(Candidate, (0));
  Outer_Match_Marker = this_context.Already_Matched.Tail;
  Insert Meaning into this_context.Already_Matched_List; /*Meanings go first*/
  Insert Candidate into this_context.Already_Matched_List;
  RSLT=Find_and_Mark_Parts(Meaning, Context);
  Meanings_List = Get_Parts(Meaning,(0));
  PL = Recursive_Match(Meanings_List, Candidates_List, Candidate);
  deallocate(Meanings_List & Candidates_List);
  RSLT.boundary_list = PL;
```

```
   while (this_context.Already_Matched_List.Tail is not Outer_Match_Marker)
      Remove this_context.Already_Matched.Tail;
   return RSLT;
}
```

APPENDIX B SECTION 1.3.2 PSEUDO CODE

```
Match_Parts(MP, CP)
{// MP is a part from the meaning template.
 // CP is a part from a candidate cluster.
    if ( MP.Type is not equal to CP.Type OR
         MP.Style is not equal to CP.Style OR
         MP.Direction is not equal to CP.Direction ) then
       return NO_MATCH;
    else
       return Match_Text(MP, CP);
} // Match_Parts Match_Text(Meaning, Candidate)
{   Params = Context->PL;
    First_Meaning_Token = TRUE;
    Meaning_Text = Get_Text_from(Meaning);
    Candidate_Text = Get_Text_from(Candidate);
    if length of Meaning_Text is 0 and length of Candidate_Text is 0 then
       return Get_Parts(Candidate, b_eval);
    // Now examine the first "Token" (or word) in the Text.
    if Meaning_Token starts with "**" then
    { build a match-curcumstance-item for this Meaning_Token.
      if Candidate_Token starts with "*" then  // Propigate this param forward.
      { Previous_item = Search_Circumstances(Candidate_Token);
         copy info from Previous_Item into the new item.
      }
      else put a pointer to the Candidate into the match-curcumstance-item.
      Matched = Get_Parts(Candidate, (b_solid|b_eval));
      Add the parts in Matched to this_context.Already_Matched_List;
      return MATCHED & empty boundary_list;
    }
    match = FALSE;
    while (Meaning_Token & Candidate_Token both exist)
    { Previous_item= 0;
      if Candidate_Token starts with "*" then
      { // do a parameter substitution.
         Previous_item= Search_Circumstances(Candidate_Token);
         if Candidate_Token starts with "**" then substitute the part from Previous_item
         else substitute the Actual-String from Previous_item.
      }
      if Meaning_Token starts with "*" then
      { build a match-curcumstance-item for this Meaning_Token.
         if Previous_item is not 0 then    // Propigate the parameter forward.
            copy info from Previous_Item into the new item.
         else put a pointer to the Candidate into the match-curcumstance-item.
      }
      else   // compare ordinary words
         if Meaning_Token is not equal to Candidate_Token then
            break out of the while loop with match equal to FALSE.
      if Meaning_Text is exhausted and Candidate_Text is exhausted then
         break out of the while loop with match equal to TRUE.
      if Candidate_Text is exhausted or Meaning_Text is exhausted then
         break out of the while loop with match equal to FALSE.
      Meaning_Token = next_token_in(Meaning_Text);
      Candidate_Token = next_token_in(Candidate_Text);
    }  // end while
    if match is TRUE then
    { RSLT = Get_Parts(Candidate, (b_eval));
      return RSLT;
    }
    this attempt has failed, delete any circumstance-items we built.
    return NO_MATCH;
} // Match_Text
```

APPENDIX C SECTION 1.3.3 PSEUDO CODE

```
Recursive_Match(Meanings_List, Candidates_List, Part* Keep_Out)
{ Result = empty new Parts_List;
  Temp_List = empty new Parts_List;

while (Meanings_List has another part && Result)
  { remove next part from Meanings_List and call it MP;
    Outer_Match_Marker = this_context.Already_Matched_List.Tail;
    Outer_Param_Marker = this_context.PL.Tail; // a marker into circumstances struct.
    Insert MP into this_context.Already_Matched_List;
    un_matched = TRUE;
    while (Candidates_List has another part & un_matched)
    { remove next part from Candidates_List and call it CP;
      Inner_Match_Marker = this_context.Already_Matched_List.Tail;
      Inner_Param_Marker = this_context.PL.Tail;
      Insert CP into this_context.Already_Matched_List;
      M_Grandchildren = Get_Parts(MP, (0));
      C_Grandchildren = Match_Parts(MP, CP);
      Boundary_List=0;
      if above Match_Parts was successful then
          if M_Grandchildren has another part then
             Boundary_List = Recursive_Match(M_Grandchildren,C_Grandchildren);
          else Boundary_List=Get_Parts(CP,(b_solid|b_eval));
      if Boundary_List then
      { Result->Append(Boundary_List);
        un_matched = FALSE;
      }
      else
      { add CP to the Temp_List; // have not matched this c-part.
        while (this_context.Already_Matched_List.Tail not equal Inner_Match_Marker)
            delete this_context.Already_Matched_List.Tail; // discard invalid matches
        while (this_context.PL.Tail not equal Inner_Param_Marker)
            delete this_context.PL.Tail);            // discard invalid params.
      }
      deallocate(Boundary_List);
      deallocate(C_Grandchildren);
      deallocate(M_Grandchildren);
    } // while Candidates_List
    if (un_matched) // we have an unmatched Meanings_Child. So, FAIL.
    { deallocate(Result);
      Result = 0;    // exit while loops and return
      while (this_context.Already_Matched_List.Tail not equal Outer_Match_Marker)
          delete this_context.Already_Matched_List.Tail; // discard invalid matches
      while (this_context.PL.Tail not equal Outer_Param_Marker)
          delete this_context.PL.Tail);             // discard invalid params.
    }
    append parts from the Temp_List onto the Candidates_List;
  } // while Meanings_List
  deallocate(Temp_List);
  if Result is not 0 then
      search Candidates_List for any solid_links and
      add these to the Result boundary_list.
  return Result;
} // Recursive_Match
```

APPENDIX D SECTION 1.3.4 PSEUDO CODE

```
Get_Parts(P, control_flags)
{ if control_flags contains b_solid then
     any_style_allowed = FALSE;
  else
     any_style_allowed = TRUE;
  if control_flags contains b_eval then
     /* Param Evaluation specified by control_flags */
     Eval_Params = TRUE;
  else
     Eval_Params = FALSE;
  PL = new empty Parts_List;
  Exclusions = this_context.Already_Matched_List;
```

```
    Curr = First Source_of or Target_of property of P;
    while (Curr exists)
    { Conn = get the connector pointed at by the Curr property;
        if (any_style_allowed or Conn.Style is Solid) and Conn is not matched
           and Conn is not in Exclusions list
           then add Conn to PL;
        Curr = Next Source_of or Target_of property of P;
    } /* loop while more such properties exist */
    if P.Type is Connector then      /* process the adjacent parts */
    { Source = get the part pointed at by the source property of P;
      Target = get the part pointed at by the target property of P;
      if Eval_Params then
      { if Source.Text starts with "*" then
          { search circumstances for the last entry whose m-part.Text is Source.Text;
            Source = the c-part pointed at by the entry just found;
          }
          if Target.Text starts with "*" then
          { search circumstances for the last entry whose m-part.Text is Target.Text;
            Target= the c-part pointed at by the entry just found;
          }
      }
      if (Target is not matched) and
         Target is not in the Exclustions list then add Target to PL;
      if (Source is not matched) and
         Source is not in the Exclustions list then add Source to PL;
    }
    return PL;
} // Get_Parts
```

APPENDIX E  DIAGRAM EDITOR PSEUDO CODE

```
// The following functions, classes and type definitions are approximations of those provided by the
// TIER™ C++ Class Library for MS Windows™:
    typedef WORD    HWND;
      // Used to represent window handles
    class Paint;
      // Paint is a class that provides necessary display painting support.
    class ModalDlg;
      // ModalDlg is a class that provides access to modal dialogue box.  The
      // GetResult function will supply the return value of the dialogue box.
    class MsgBox;
      // This class provides the system with a way to easily display messages to the user through a
      // message window (member function Show will perform the actual display).
    class Window;
      // Window is a class that provides the basis for a window application.  WinInvalidateRect,
      // WinUpdate, WinPostMessage, WinSendMessage, WinPostQuitMessage and WinDefMessageHandler
      // are all member functions of this class.
    class OverlappedWindow;
      // OverlappedWindow is a class that provides the basis for an overlapped window application.
      // GetClient is a member function of this class. OverlappedWindow is derived from Window.
    void GetClient(int X, int Y, int CX, int CY);
      // Determine the inner dimensions of the application window
    void WinInvalidateRect(int X, int Y, int CX, int CY, BOOL bRepaint);
      // Sets area of application for repainting, may post paint message.
    void WinUpdate();
      // Determines whether the application needs repainting.
    WinPostMessage(Window* lpWinTo, unsigned iMessage, WORD wParam, LONG lParam);
      // Post message to requested window.
    WinSendMessage(Window* lpWinTo, unsigned iMessage, WORD wParam, LONG lParam);
      // Send message to requested window.
    void WinPostQuitMessage(int nExitCode = 0);
      // Posts WM_QUIT message to application.
    LONG WinDefMessageHandler(HWND hWnd, unsigned iMessage, WORD wParam, LONG lParam);
      // Default handling of messages.

// The following is C++ pseudo code that is unique to the invention and the editing system:
// If the comment following a function begins with ***** this means that the function body is not
// represented in pseudo code, but is simply described in a manner such that a programmer could create
// that function to perform the required operation.  The comment will be similar to the following:
//***** This will describe the function's capabilities.
// The term "Shape" is used in various forms here.  It is synonymous with the term "part".
```

```
struct Point { int x, y; Point (int X, int Y) {x=X; y=Y;}};

Point MAKEPOINT( LONG Coordinates );
    //***** Splits the 32 bit integer into two 16 bit integers representing an x, y pair.

void Rendition_Initialize( Window* Parent );
    //***** Initialize shape management functions. This includes storing a reference to the
    // application window for I/O purposes.

void Rendition_Cleanup( );
    //***** Clean up after shape management functions. This includes releasing necessary storage.

class Shape_Version;
    // This class maintains version information about any particular part (eg version number).

class File_Version;
    // This class maintains version information about any particular diagram (eg version number
    // and compilation state).

class Property_List;
    // This class manages all of the properties and relationships of shapes. This list can
    // include connection relationships, code properties and match properties to name a few.

enum SKind { GPoint, GRectangle, GTriangle, GConnector };
    // Represents the kind (class) of shape. When given a shape pointer, it is used to determine the
    // derived class of the referenced object.

enum Shape_Style { Solid, Dashed, Bold };
    // One factor in determines which pen will be used to draw a shape
class Shape;
    // This is the base class for all shapes (Rectangle, Triangle and Connector). All member
    // functions and components are either declared in this class and/or in the classes derived
    // from the this class. The following are some of the member components of this class:
    Point       Center;    // Indicates the coordinate or point which is in the center of the Shape.
    char*       Text;      // Contains the text property for this shape.
    HPEN*       Pen;       // Pointer to Windows pen that is used to draw shape. This represents the
                           // style property of the shape.
    HPEN*       HiPen;     // Pointer to Windows pen that is used to highlight shape.
    SKind       Tag;       // Indicates the value of the type property for the shape.
    int         Handle;    // Persistent reference to shape.
    int         RHandle;   // Persistent reference to rendition in which the shape resides.
    Shape_Version SVersion;   // Shape version information.
    Property_List PList;      // List of properties and relationships.

typedef Shape * Shape_Ptr;    // Pointer to a shape object class Rectangle;// Rectangle is derived from Shape class. Some of the member components of this class:
    Point  Left_Upper;   // Represents the left upper corner of the rectangle.
    Point  Right_Lower;  // Represents the right lower corner of the rectangle.
    BOOL   Context;      // Indicates whether the rectangle is a context.
class Triangle; // Triangle is derived from Shape class. Some of the member components of this class:
    Point  Top;          // Represents the top corner of the triangle.
    Point  Left_Lower;   // Represents the left lower corner of the triangle.
    Point  Right_Lower;  // Represents the right lower corner of the triangle.
class Connector;// Connector is derived from Shape class. Some of the member components of this class:
    int    Def_Point_Count; // Number of vertices in the connector.
    BOOL   Directional;     // Represents the directional property of the connector.
    Shape_Ptr Source;       // Source shape of connection.
    Shape_Ptr Target;       // Target shape of connection.

// Each shape's constructor, which takes the defining points of the shape as arguments, initializes
// all of the member components based on its arguments and editor's defaults. Each destructor will
// deallocate the shape's associated properties. The following are some of the member function
// declarations for the shape class and its derived classes:
    Rectangle(Point Left_Upper, Point Right_Lower); //***** Rectangle Constructor.
    Triangle(Point TopP, Point LeftP, Point RightP); //***** Triangle Constructor.
    Connector(Shape_Ptr Source, Shape_Ptr Target);   //***** Connector Constructor.
    void Draw();    //***** Draw the shape based on shape tag and location components.
    void Erase();   //***** Erase the shape based on shape tag and location components.
    void Highlight(BOOL On);      //***** Draw with/without shape highlighting.
    BOOL In_Shape(int X, int Y);  //***** Return TRUE if the coordinate is inside of the shape.
    BOOL Drag(int X, int Y);
        //***** Move the shape (display and components) based on the absolute X, Y change.
    void Set_Style(Shape_Style SStyle);
```

```
//***** Change the style property of the shape, adjust the drawing pen and redraw the shape.
void Size(int X, int Y, BOOL First_Call = FALSE);
    //***** Size shape based on the delta between the initial point (set when first call is
    // TRUE) and the current  point represented by x,y.  Note the initial delta will be 0.
    // Update the location and version components.  Draw the resized shape.
void Set_Context(BOOL Is_Context);
    //***** For Rectangle: set the context flag.  Update version information and effected shapes
    // (eg. set context shapes now inside this new context).  Redisplay rectangle as a context.
void Move_To( Point Upper_Left, Point Lower_Right);
    //***** For Rectangle: Erase current image of rectangle and set rectangle corners to new
    // points.  Update version, center and effected properties.  Draw rectangle at new location.
void Move_To( Point TopP, Point LeftP, Point RightP);
    //***** For Triangle: Erase current image of triangle and set triangle corners to new points.
    // Update version, center and effected properties.  Draw triangle at new location.
void Set_Directional(BOOL Is_Directional);
    //***** For Connector: modify directional property and update other effected properties.  Draw
    // the modified connector.
void Change_Target(Shape_Ptr New_Target);
    //***** For Connector: modify connector's target relationship and update other effected
    // properties.  Draw the modified connector.
void Change_Source(Shape_Ptr New_Source);
    //***** For Connector: modify connector's source relationship and update other effected
    // properties.  Draw the modified connector.
void Change_Selection(int DPoint_Cnt);
    //***** For Connector: modify connector's vertices count and layout.  Draw the modified
    //connector.
// Change_Prop describes the different kinds of property changes that might be performed on a shape's
// properties.  This is primarily used to support version control actions.
enum Change_Prop
    {Position, Size, Color, Form, Text, Connection, Style, CWidth, CPath, Code, Value, Match,
    Meaning_Template, Boundary_Major, Add_Entity, Del_Entity, General, Import_Export};

class File_Rec;
    // Stores the file name, file handle, list of shapes (the display list), list of properties and
    // and version of the file (the diagram stored in the file).

class Lib_Info;
    // The library information class is used to track all pertinent diagram information.  This
    // includes, but is not limited to, shape positioning, property relationships, diagram and
    // library relationships and version control.  The following are a few of the member components
    // functions of the Lib_Info class:
    char*      Library_Name;  // File name of diagram library.
    int        File_Count;    // Number of files associated with library (1 or more).
    File_Rec*  FList;         // List for file records describing all diagrams in the library.
    int  Add_Ref(Shape_Ptr New_Shape);
        //***** Add the new shape to the appropriate file display list and the library.  Perform any
        // necessary version control operations (based on shape type, position, etc).
    BOOL Del_Ref(Shape_Ptr Dead_Shape);
        //***** Remove the obsolete shape from the file display list and the library.  Perform any
        // necessary version control operations (based on the shape type, position, etc).
    void Update_Version(Shape_Ptr Modified_Shape, Change_Prop CP_Kind);
        //***** Perform any necessary version control operations based on the affected shape and the kind
        // of property that has been modified.

Shape_Ptr Select_Figure(Point Mouse_Pos, Window* Parent);
    //***** Review all shapes in the diagram and determine if any shape includes the given mouse
    // position.  If more than one shape includes this point, ask the user which shape is being
    // requested.  Return a pointer to the in memory data structure of the selected graphical image.

void Repaint_Region ( Point Left_Top, Point Right_Bottom );
    //***** Repaint the rectangular region of the diagram specified by the two points.

void Move_Displayed_Object(Shape_Ptr Moved_Shape);
    //***** Move the stored location of an existing shape in the display list, also move all associated
    // connectors.  Repaint the display as needed.

class TextDlg : public ModalDlg {
    private:
        Shape_Ptr    Curr_Shape;   // Shape whose text is being edited.
        EditWindow*  lpFileEdit;   // Edit window user interacts with.
    public:
        TextDlg(Shape_Ptr Current_Shape);
            //***** Constructor for TextDlg class, actually sets up modal edit window for shape text.
        ~TextDlg(void);
            //***** Destructor for TextDlg class, cleans up after edit window.
```

```cpp
    BOOL DlgMessageHandler(HWND hDlg, unsigned iMessage, WORD wParam, LONG lParam);
        //***** Message loop to provide support for the edit window.
};

enum Current_State
    { State_None,

// shape selected, operate on this shape
        State_Shape_Selected,

// select either new source or target for an existing connector
        State_Select_Source, State_Select_Target, // Shape creation
        State_Start_Create_Rectangle, State_Start_Create_Rectangle_Cntx,
        State_Start_Create_Triangle, State_Tri_Corner2, State_Tri_Corner3,
        State_Create_Rectangle, State_Create_Triangle,
        State_CR_Select_Source, State_CR_Select_Target, // Operations on shapes
        State_Start_Move_Shape, State_Move_Shape,
        State_Start_Size_Shape, State_Size_Shape );
class EWin : public OverlappedWindow {
    private:
        int             Max_Width;      // Rendition Width
        int             Max_Height;     // Rendition Height
        int             Page_Width;     // Screen Width
        int             Page_Height;    // Screen Height
        Shape_Ptr       Curr_Shape;     // Shape currently selected
        Current_State   State;          // Current state of application (see
                                        //  potential states declared above)
        Lib_Ptr         Lib_Data;       // Library data & management void Initialize_Win_Info();
            //***** Initialize window application information (eg. scroll bars, window size, etc).

void Update_Rendition_Position
            (WORD Scroll_Code, LONG Curr_Position, unsigned Scroll_Orientation);
            //***** With the information stored with regards to the present display, determine what
            // portion of the rendition is to be drawn based on the scrolling request. Then generate the
            // appropriate calls to perform the member component updates and the screen update.

void Perform_Open_Activities ( WORD Open_Kind );
            //***** Request information from user to determine the set of renditions to open (zero or
            // more). Call the appropriate file I/O routines to read any requested diagram data from
            // disk. Create the in memory representation of the disk data and then set all of the shape,
            // file and library member components to the appropriate values.

void Perform_Close_Activities( WORD Close_Kind );
            //***** Request information from user to determine the set of renditions to be written (one or
            // more). Call the appropriate file I/O routines to translate the requested in memory data
            // into disk data representation and then write this translated data to disk.

// For the following, perform operations based on the current state and the specific message
        // (including data sent with the message).
        void Interp_Left_Up ( LONG Coord );
        void Interp_Mouse_Move( WORD Keys, LONG Coord );
        void Interp_Left_Click( WORD Keys, LONG Coord );
        void Interp_Right_Click( WORD Keys, LONG Coord );
        void Interp_Left_Dbl_Click ( LONG Coord );
        void Interp_Keystroke ( char Key );

public:
        EWin( HANDLE hInstance, HANDLE hPrevInstance, int nCmdShow );
            //***** Constructor for EWin class, sets up application window.
        ~EWin();
            //***** Destructor for EWin class, cleans up after app window.
        BOOL WinMessageHandler( HWND hWnd, unsigned iMessage, WORD wParam, LONG lParam );
            // Perform operations based on the messages sent by the windowing system.
};

// Here is the diagram editor's message handling function. This function is called every time a message
// is generated which is to be processed by the diagram editor. The function analyzes a given message,
// performs the needed actions and returns to its caller.
```

```
BOOL EWin::WinMessageHandler( HWND hWnd, unsigned iMessage, WORD wParam, LONG lParam )
{
   int   x, y, cx, cy;
   switch( iMessage ) {
      case WM_CREATE:  // Indicates window application creation.
         // Initialize state to State_None.
         State = State_None;
         // Initialize current shape.
         Curr_Shape = (Shape_Ptr)0L;
         // Allocate the library (call the constructor).
         Lib_Data = new Lib_Info();

// Set up window app information, and shape management functions
         Initialize_Win_Info();
         Rendition_Initialize( this );

break;
      case WM_SIZE:  // Indicates that the applications window has been sized.
         // get the actual application page dimensions where x & y = 0
         GetClient(x, y, cx, cy);
         // if bigger window, draw uncovered portion
         if (cx > Page_Width || cy > Page_Height)
            WinInvalidateRect(Page_Width, Page_Height, cx, cy, TRUE);

// reset the page dimensions
         Page_Width = cx;
         Page_Height = cy;
         break;

case WM_VSCROLL:  // Indicates that the application window has been scrolled either
      case WM_HSCROLL:  // through the scroll bars or some key such as page down.
         // From the window message information, determine what the new position
         //    of the rendition should be.
         Update_Rendition_Position(wParam, lParam, iMessage);
         // Call window routine to indicate that a repaint is required
         WinUpdate();
         break;

case WM_KEYUP:  // The user has released a key.
         Interp_Keystroke(wParam);
         break;

case WM_LBUTTONDBLCLK:  // The user has double clicked with the left mouse button.
         Interp_Left_Dbl_Click(lParam);
         break;

case WM_LBUTTONDOWN:  // The user has depressed the left mouse button.
         Interp_Left_Click(wParam, lParam);
         break;

case WM_RBUTTONDOWN:  // The user has depressed the right mouse button.
         Interp_Right_Click(wParam, lParam);
         break;

case WM_MOUSEMOVE:  // The user has moved the mouse.
         Interp_Mouse_Move(wParam, lParam);
         break;

case WM_LBUTTONUP:  // The user has released the left mouse button.
         Interp_Left_Up(lParam, Curr_Shape);
         break;

case WM_COMMAND:  // A menu command has been selected (or the editor has sent itself a command
                       // message).
         switch( wParam ) {
            case IDM_ADD_DIAG:
            case IDM_NEW_DIAG:
            case IDM_OPEN_DIAG:
               Perform_Open_Activities( wParam );
               break;

case IDM_SAVE_DIAG:
            case IDM_SAVE_AS_DIAG:
               Perform_Close_Activities( wParam );
               break;
```

```
case IDM_EXIT:
   WinDestroy( );
   break;

case IDM_XCREATE:   // Create Context.
   State = State_Start_Create_Rectangle_Cntx;
   break;

case IDM_RECTANGLE:   // Create Rectangle.
   State = State_Start_Create_Rectangle;
   break;
case ID_RECTANGLE_CR: {   // Process mouse input for rect/cntx creation.
   static Point Start;
   Point    Pt = MAKEPOINT( lParam );

if (State == State_Start_Create_Rectangle ||
       State == State_Start_Create_Rectangle_Cntx) {
      // First call to this create, initialize start, allocate
      //    rectangle, set Context property (if appropriate),
      //    update the state to indicate that the system is
      //    creating a rectangle and set Curr_Shape to new Rec.
      Start = Pt;
      Rectangle FAR *Rec = new Rectangle(Start, Pt);
      if (State == State_Start_Create_Rectangle_Cntx)
         Rec->Set_Context(TRUE);
      State = State_Create_Rectangle;
      Curr_Shape = Rec;
   }
   else // Subsequent call, change Right_Lower to new point.
      ((Rectangle FAR *)Curr_Shape)->Move_To
                   (Start.x, Start.y, Pt.x, Pt.y, TRUE);
   }
   break;

case IDM_TRIANGLE:   // Create Triangle
   State = State_Start_Create_Triangle;
   break;

case ID_TRIANGLE_CR: {   // Process mouse input for triangle creation.
   static Point Corner1;
   static Point Corner2;
   Point    Pt = MAKEPOINT( lParam );

if (State == State_Start_Create_Triangle) {
      // First call to this create
      State = State_Create_Triangle;
      Corner2 = Corner1 = Pt;
      Triangle FAR *Tri = new Triangle(Corner1, Corner1, Pt);
      Curr_Shape = Tri;
      State = State_Tri_Corner2;
   }
   else { // Second or third call to set lower points.
      if (State == State_Tri_Corner2)
         Corner2 = Pt;
      // Move (and draw as a result of the move) the triangle
      //  to it's new position (w/ 2 or 3 specified corners).
      ((Triangle FAR *)Curr_Shape)->Move_To
         (Corner1, Corner2, Pt, TRUE);
   }
   }
   break;

case IDM_CCREATE: // Create Connector
   State = State_CR_Select_Source;
   WinPostMessage( this, WM_COMMAND, ID_CONNECTOR_CR, ConRes );
   break;

case ID_CONNECTOR_CR: {   // Process mouse input for connector creation.
      static Shape_Ptr Source, Target;
      Connector FAR *Con = (Connector FAR *)OL;
      if (State == State_CR_Select_Source) {
         Source = (Shape_Ptr)lParam;
         State = State_CR_Select_Target;
```

```
}
    else { // state == select target
       Target = (Shape_Ptr)lParam;
       if (Target == Source) {
          MsgBox(this).Show
             ("Select different Target, current selection = Source.",
              "Warning", MB_ICONINFORMATION | MB_OK);
          break;
       }
          Con = new Connector(Source, Target);
          Con->Draw();
          Curr_Shape = Con;
          Lib_Data->Add_Ref(Con);
          State = State_Shape_Selected;
       }
    }
    break;

case IDM_LINE_C: // Change connector to a 2 point line.
   ((Connector FAR *)Curr_Shape)->Change_Selection(2);
   Move_Displayed_Object( Curr_Shape );
   Lib_Data->Update_Version( Curr_Shape, CPath );
   break;

case IDM_POLYLINE_3: // Change connector to a line with a vertex.
   ((Connector FAR *)Curr_Shape)->Change_Selection(3);
   Move_Displayed_Object( Curr_Shape );
   Lib_Data->Update_Version( Curr_Shape, CPath );
   break;

case IDM_SOLID: // Change connector's style to solid.
   ((Connector FAR *)Curr_Shape)->Set_Style(Solid);
   Lib_Data->Update_Version( Curr_Shape, Style );
   break;

case IDM_DASHED: // Change connector's style to dashed.
   ((Connector FAR *)Curr_Shape)->Set_Style(Dashed);
   Lib_Data->Update_Version( Curr_Shape, Style );
   break;

case IDM_CDIRECTIONAL: // Invert connector's current directional property.
   ((Connector FAR *)Curr_Shape)->Set_Directional
                           (!((Connector FAR *)Curr_Shape)->Is_Directional());
   Lib_Data->Update_Version( Curr_Shape, Style );
   break;

case IDM_CSOURCE: // Change the connector's source.
   State = State_Select_Source;
   break;

case IDM_CTARGET: // Change the connector's target.
   State = State_Select_Target;
   break;

case ID_CONNECTOR_ATTR: // Process mouse input for new source/target selection.
   // lParam can = 0 when no shape is selected
   if (lParam != 0) {
      if (State == State_Select_Source)
         ((Connector FAR *)Curr_Shape)->Change_Source((Shape_Ptr)lParam);
      else
         ((Connector FAR *)Curr_Shape)->Change_Target((Shape_Ptr)lParam);
      // Move the modified connector in the display list.
      Move_Displayed_Object( Curr_Shape );
      Lib_Data->Update_Version( Curr_Shape, Connection );
      State = State_Shape_Selected;
   }
   break;

case ID_MOVE_SHAPE: { // Process mouse input for shape movement.
   static Point Start;
   static BOOL  Start_Move;
   Point    Pt = MAKEPOINT( lParam );

if (State == State_Start_Move_Shape) {
```

```
        Start_Move = Curr_Shape->In_Shape(Pt.x, Pt.y);
        if (Start_Move) {  // Start the move only if point inside shape.
            Start = Pt;
            State = State_Move_Shape;
        }
    }
            else if (Start_Move) {  // The move is in progress, drag shape based on movement.
                int Move_X = Pt.x - Start.x;
                int Move_Y = Pt.y - Start.y;
                Curr_Shape->Drag(Move_X, Move_Y);
                Start = Pt;
                Lib_Data->Update_Version( Curr_Shape, Position );
            }
            }
            break;

case ID_SIZE_SHAPE: {  // Process mouse input for sizing current shape.
            Point    Pt = MAKEPOINT( lParam );
            // The first pass through this current sizing effort, the state will be
            // State_Start_Size_Shape, inform size routine whether this is the first
            // call (prepare for sizing) or a subsequent call (perform sizing operation).
            Curr_Shape->Size(Pt.x, Pt.y, State == State_Start_Size_Shape);
            Lib_Data->Update_Version( Curr_Shape, Size );
            State = State_Size_Shape;
            }
            break;

case IDM_DELETE:  // Delete current shape.
            Curr_Shape->Highlight(TRUE);
            // if the user indicates that this is the shape to delete, erase it from the display
            // remove it from the library (and associated structures), delete the object and its
            // properties and reinitialize the current shape and the current state.
            if ( MsgBox(this).Show("Do you wish to delete this figure?",
                                    "Object Deletion", MB_YESNO | MB_ICONQUESTION)
                    == IDYES ) {
                Curr_Shape->Erase();
                Lib_Data->Del_Ref( Curr_Shape );
                delete Curr_Shape;
                Curr_Shape = (Shape_Ptr)0L;
                State = State_None;
            }
            else
                Curr_Shape->Highlight(FALSE);
            break;

case IDM_TEXT:  // Edit text of current shape.
            if (TextDlg( Curr_Shape ).GetResult()) {
                Curr_Shape->Draw();
                Lib_Data->Update_Version( Curr_Shape, Text );
            }
            break;
        }
    break;

case WM_PAINT:  //  Process system paint message.
    {
    Paint    Paint_Obj( this );
    Paint_Obj.GetrcPaint( x, y, cx, cy );

Point Left_Top(x, y);
    Point Right_Bottom(cx, cy);
    Repaint_Region ( Left_Top, Right_Bottom );

}
    break;

case WM_DESTROY:  // Prepare for the application to be terminated.
    // Clean up shape management functions.
    Rendition_Cleanup( );
    WinPostQuitMessage();
    break;

default:  // No special processing, let system default handle message.
    return WinDefMessageHandler( hWnd, iMessage, wParam, lParam );
```

```cpp
void EWin :: Interp_Left_Up ( LONG Coord )
{   // Interpret the left mouse button up based on the state of the application.  Send application
    // message loop a command message (along with the associated data) indicating the next
    // operation to be performed.
    switch( State ) {
        case State_Create_Rectangle:
            WinSendMessage( this, WM_COMMAND, ID_RECTANGLE_CR, Coord );
            Lib_Data->Add_Ref( Curr_Shape );
            State = State_Shape_Selected;
            break;

case State_Move_Shape:
        case State_Size_Shape:
            if (State == State_Move_Shape)
                WinSendMessage( this, WM_COMMAND, ID_MOVE_SHAPE, Coord );
            else {
                WinSendMessage( this, WM_COMMAND, ID_SIZE_SHAPE, Coord );
            }
            Move_Displayed_Object( Curr_Shape );
            State = State_Shape_Selected;
            Cursor Win_Cursor;
            Win_Cursor.Load( CURSOR_ARROW );
            WinSetClassCursor( Win_Cursor.GetHandle() );
            Win_Cursor.Set();
            Win_Cursor.Show();
            break;
    }
} // Interp_Left_Up void EWin :: Interp_Mouse_Move( WORD Keys, LONG Coord )
{   // Interpret the mouse movement based on the state of the application.  Send application
    // message loop a command message (along with the associated data) indicating the next
    // operation to be performed.
    switch( State ) {
        case State_Create_Rectangle:
            WinSendMessage( this, WM_COMMAND, ID_RECTANGLE_CR, Coord );
            break;

case State_Create_Triangle:
            WinSendMessage( this, WM_COMMAND, ID_TRIANGLE_CR, Coord );
            break;

case State_Tri_Corner2:
            WinSendMessage( this, WM_COMMAND, ID_TRIANGLE_CR, Coord );
            break;

case State_Tri_Corner3:
            WinSendMessage( this, WM_COMMAND, ID_TRIANGLE_CR, Coord );
            break;

case State_Move_Shape:
            WinSendMessage( this, WM_COMMAND, ID_MOVE_SHAPE, Coord );
            break;

case State_Size_Shape:
            WinSendMessage( this, WM_COMMAND, ID_SIZE_SHAPE, Coord );
            break;

case State_Shape_Selected:
            // Since connectors are not sized or moved individually, do not fall
            //    through to the remainder of the case statement (do so for other shapes).
            if ( Curr_Shape->Get_Shape_Tag() == GConnector ) break;
        case State_Start_Move_Shape:
        case State_Start_Size_Shape: {
            // Prepare to move or size shapes (Connectors can only be moved or sized based on the shapes
            // that they are connected to).
            Cursor Win_Cursor;
            Point    Pt = MAKEPOINT( Coord );
            static BOOL   Reset_Cursor;
              // Initialized to FALSE by default due to C++ definition of static variable.
                if ( Curr_Shape->In_Shape(Pt.x, Pt.y) ) {
                    if ( Curr_Shape->On_Boundary(Pt.x, Pt.y) ) { // On Shape boundary, prepare to size.
                        Win_Cursor.Load(Curr_Shape->Get_Size_Cursor(Pt.x, Pt.y));
                        State = State_Start_Size_Shape;
                    }
```

```
            else {  // Inside of shape, prepare to move.
                Win_Cursor.Load( CURSOR_CROSS );
                State = State_Start_Move_Shape;
            }

WinSetClassCursor( Win_Cursor.GetHandle() );
            Win_Cursor.Set();
            Win_Cursor.Show();
            Reset_Cursor = TRUE;
        }
        else if ( Reset_Cursor ) { // Cursor outside of shape, return to normal cursor.
            Win_Cursor.Load( CURSOR_ARROW );
            WinSetClassCursor( Win_Cursor.GetHandle() );
            Win_Cursor.Set();
            Win_Cursor.Show();
            Reset_Cursor = FALSE;
            State = State_Shape_Selected;
        }
        }
        break;
    }
} // Interp_Mouse_Move void EWin :: Interp_Left_Click( WORD Keys, LONG Coord )
{ // Interpret the left mouse button down based on the state of the application.  Send application
  // message loop a command message (along with the associated values) indicating the next
  // operation to be performed.
    switch( State ) {
        case State_Select_Source:
        case State_Select_Target: {
            Point    MouseStart = MAKEPOINT( Coord );
            Shape_Ptr Rtn_Shape = Select_Figure(MouseStart, this);
                // Select a shape at this location.

WinSendMessage( this, WM_COMMAND, ID_CONNECTOR_ATTR, LONG(Rtn_Shape) );
            }
            break;

case State_CR_Select_Source:
        case State_CR_Select_Target: {
            Point    MouseStart = MAKEPOINT( Coord );
            Shape_Ptr Rtn_Shape = Select_Figure(MouseStart, this);
                // Select a shape at this location.

if (Rtn_Shape != (Shape_Ptr)0L)
                WinSendMessage(this, WM_COMMAND, ID_CONNECTOR_CR, LONG(Rtn_Shape));
            else
                MsgBox(this).Show( "No Shape selected for connector, try again.",
                                   "Warning", MB_ICONINFORMATION | MB_OK );
            }
            break;

case State_Start_Create_Rectangle:
        case State_Start_Create_Rectangle_Cntx:
            WinSendMessage( this, WM_COMMAND, ID_RECTANGLE_CR, Coord );
            break;

case State_Start_Create_Triangle:
            WinSendMessage( this, WM_COMMAND, ID_TRIANGLE_CR, Coord );
            break;

case State_Tri_Corner2:
            WinSendMessage( this, WM_COMMAND, ID_TRIANGLE_CR, Coord );
            State = State_Tri_Corner3;
            break;
        case State_Tri_Corner3:
            WinSendMessage( this, WM_COMMAND, ID_TRIANGLE_CR, Coord );
            Lib_Data->Add_Ref( Curr_Shape );
            State = State_Shape_Selected;
            break;

case State_Start_Move_Shape:
        case State_Start_Size_Shape:
```

```
            if (State == State_Start_Move_Shape)
                WinSendMessage( this, WM_COMMAND, ID_MOVE_SHAPE, Coord );
            else
                WinSendMessage( this, WM_COMMAND, ID_SIZE_SHAPE, Coord );
            break;
        }
}   //Interp_Left_Click void EWin :: Interp_Right_Click( WORD Keys, LONG Coord )
{   // Right mouse down is just used to clear the current state, the current shape and to reset the
    // cursor.
    Curr_Shape = (Shape_Pte)OL;
    State = State_None;
    Win_Cursor.Load( CURSOR_ARROW );
    WinSetClassCursor( Win_Cursor.GetHandle() );
    Win_Cursor.Set();
    Win_Cursor.Show();
}   //Interp_Right_Click void EWin :: Interp_Left_Dbl_Click ( LONG Coord )
{   // If the state is State_None, determine if there is a shape at the double click location.  If
    // there is one, select it.  If there is more than one, prompt the user to determine which shape
    // to select.  Set the application state to State_Shape_Selected.
    if ( State == State_None ) {
        Point    MouseStart = MAKEPOINT( Coord );
        Curr_Shape = Select_Figure (MouseStart, this);
        if (Curr_Shape)
            State = State_Shape_Selected;
    }
}   //Interp_Left_Dbl_Click void EWin :: Interp_Keystroke ( char Key )
{   // Interpret the keyboard input based on the state of the application.  Send the application
    // message loop a command message or system message (along with the associated data) indicating the
    // next operation to be performed.
    Cursor   Win_Cursor;
    switch (Key) {
        case 'C':
            Win_Cursor.Load( CURSOR_ARROW );
            WinSetClassCursor( Win_Cursor.GetHandle() );
            Win_Cursor.Set();
            Win_Cursor.Show();
            WinPostMessage( this, WM_COMMAND, IDM_CCREATE, OL );
            break;
        case 'D':
            if (State == State_Shape_Selected    ||
                State == State_Start_Move_Shape  ||
                State == State_Start_Size_Shape )
                WinPostMessage( this, WM_COMMAND, IDM_DELETE, OL );
            break;
        case 'E':
            if (State == State_Shape_Selected    ||
                State == State_Start_Move_Shape  ||
                State == State_Start_Size_Shape )
                WinPostMessage( this, WM_COMMAND, IDM_TEXT, OL );
            break;
        case 'R':
            Win_Cursor.Load( CURSOR_ARROW );
            WinSetClassCursor( Win_Cursor.GetHandle() );
            Win_Cursor.Set();
            Win_Cursor.Show();
            WinPostMessage( this, WM_COMMAND, IDM_RECTANGLE, OL );
            break;
        case 'S':
            WinPostMessage( this, WM_COMMAND, IDM_SAVE_REND, OL );
            break;
        case 'T':
            Win_Cursor.Load( CURSOR_ARROW );
            WinSetClassCursor( Win_Cursor.GetHandle() );
            Win_Cursor.Set();
            Win_Cursor.Show();
            WinPostMessage( this, WM_COMMAND, IDM_TRIANGLE, OL );
            break;
```

```
         case 'X':
            Win_Cursor.Load( CURSOR_ARROW );
            WinSetClassCursor( Win_Cursor.GetHandle() );
            Win_Cursor.Set();
            Win_Cursor.Show();
            WinPostMessage( this, WM_COMMAND, IDM_XCREATE, OL );
            break;
         case 33: // VK_PRIOR (PAGE_UP)
            WinSendMessage( this, WM_VSCROLL, SB_PAGEUP, OL );
            break;
         case 34: // VK_NEXT (PAGE_DOWN)
            WinSendMessage( this, WM_VSCROLL, SB_PAGEDOWN, OL );
            break;
         case 35: // VK_END (END)
            WinSendMessage( this, WM_VSCROLL, SB_BOTTOM, OL );
            break;
         case 36: // VK_HOME (HOME)
            WinSendMessage( this, WM_VSCROLL, SB_TOP, OL );
            break;
         case 37: // VK_LEFT (LEFT)
            WinSendMessage( this, WM_HSCROLL, SB_PAGEUP, OL );
            break;
         case 38: // VK_UP (UP)
            WinSendMessage( this, WM_VSCROLL, SB_LINEUP, OL );
            break;
         case 39: // VK_RIGHT (RIGHT)
            WinSendMessage( this, WM_HSCROLL, SB_PAGEDOWN, OL );
            break;
         case 40: // VK_DOWN (DOWN)
            WinSendMessage( this, WM_VSCROLL, SB_LINEDOWN, OL );
            break;
      }
} // Interp_Keystroke
```

APPENDIX F PSEUDO CODE FOR MEANING ANALYSIS

```
// Meaning-analysis of a Behavior_Expression given a context and circumstances
Meaning_Analysis(Behavior_Expression, Context0)
{  // Circumstances are global
   Candidate = Context0->First_Part(Behavior_Expression);
   // Get the first part
   while (Candidate)
   {  Meaning = Context0->First_Meaning();
      while (Meaning)
      {  Match_Result = Context0->Cluster_Match(Meaning, Candidate);
         Results_Pool->Insert(Match_Result); // Add the Result to the Pool
         Control_Flags = Context0->Match_Loop_Control(Results_Pool);
         if (Control_Flags.Process_Results)
         {  Match_Result = Results_Pool->Remove();
            Working_Pool->Insert(Match_Result.Boundary_List);
            if (Match_Result.Successful)
            {  Context1 = new Context(Context0, Match_Result.Definition_Context);
               Meaning_Analysis(Match_Result.Definition_Cluster, Context1);
            }
            else
               Context->Action_Execution(Candidate);
         }
         if (Control_Flags.Exit_Loop)   break;  // Exit match loop
         Meaning = Context0->Next_Meaning();
      }
      Candidate = Context0->Next_Part(Working_Pool);
   }
   Context0->Conclude_Meaning_Analysis();
   return;
}
```

We claim:

1. In a computer system which executes a computer program, the computer system including a storage unit, a central processing unit, input means for providing input data to the storage unit and central processing unit, and output means for providing discernible indications of actions performed by the central processing unit, a machine-executable method for implementing a control system, using:
- a plurality of parts, each part including a data object and having a first portion identifying the part, a second portion including a series of associated data items, and a third portion for referencing another part; and
- pluralities of interrelated parts, each part in any plurality of interrelated parts including a reference to, or being referenced by, another part in the plurality of interrelated parts; and
- a plurality of clusters, each cluster including a data structure with one part or a plurality of interrelated parts;

the method including the steps of:
- storing at least one cluster;
- storing a plurality of meanings, each meaning including:
  - a template having one part or a plurality of interrelated parts; and
  - a definition cluster;
- storing a plurality of logic components, each logic component including an invocable procedure which is executable by the central processing unit;
- providing a plurality of contexts, each context including an associated set of meanings and an associated set of logic components, and means for identifying a context as a definition context;
- designating a first context as a current context;
- designating a first cluster as a current behavior expression;
- (a) comparing parts of the current behavior expression with templates of the set of meanings associated with the current context;
- (b) for a meaning of the set of meanings whose template matches a part or a plurality of interrelated parts of the current behavior expression:
  - designating the definition cluster of the meaning as the current behavior expression; and
  - designating as a new current context, a second context identified as a definition context by the current context;
- (c) performing steps (a) and (b) until a part in the current behavior expression is found which does not match a part in a template in the current context;
  - invoking a logic component associated with the current context and which is identified by a data item in the second portion of the part found in step (c);
  - performing a control system action by executing the logic component; and
  - providing a discernible indication of the control system action.

2. The method of claim 1, wherein step (c) includes recursively performing steps (a) and (b) and accumulating a plurality of parts in the behavior expression which do not match parts in a template in the current context, further including executing the invoking and performing steps for each part of the plurality of parts and executing the second providing step for one or more parts of the plurality of parts.

3. The method of claim 1, wherein in step (a) the parts form a candidate cluster in which each part of the candidate cluster includes a reference to, or is referenced by, another part of the candidate cluster, step (a) further including:
- (a1) comparing the candidate cluster with the templates; and
- (a2) detecting one or more meanings in the current context having templates matching the candidate cluster.

4. The method of claim 3, further including performing steps (b) and (c) for each meaning of the one or more meanings after all of the one or more meanings are found.

5. The method of claim 3, wherein steps (b) and (c) are performed for each meaning of the one or more meanings when said each meaning is detected.

6. The method of claim 1, wherein the first cluster includes a plurality of interrelated parts, further including performing steps (a), (b), and (c) until substantially all parts of the plurality of interrelated parts have been compared with templates.

7. In a computer system which executes a computer program, the computer system including a storage unit, a central processing unit, input means for providing input data to the storage unit and central processing unit, and output means for providing discernable indications of actions performed by the central processing unit, a machine-executable method for implementing a control system, using:
- a plurality of parts, each part including a data object and having a first portion identifying the part, a second portion including a series of associated data items, and a third portion for referencing another part;
- a plurality of clusters, each cluster including a data structure with one part or a plurality of interrelated parts such that each part of the plurality of interrelated parts includes a reference to, or is referenced by, another part of the plurality of interrelated parts; and
- means for controlling recursions in response to third portions of parts;

the method including the steps of:
- storing at least one cluster;
- storing a plurality of meanings, each meaning including:
  - a template having one part or a plurality of interrelated parts such that each part of the plurality of interrelated parts includes a reference to, or is referenced by, another part of the plurality of interrelated parts; and
  - a definition cluster;
- storing a plurality of logic components, each logic component including an invocable procedure which is executable by the central processing unit;
- providing a plurality of contexts, each context including an associated set of meanings and an associated set of logic components, each meaning of the associated set of meanings including means for identifying a context as a definition context;
- designating a first context as a current context;
- designating a first cluster as a current behavior expression;
- (a) recursively performing meaning analysis steps (a1) and (a2) until a part in the current behavior expression is found which does not match a part in a template, the meaning analysis steps including:
(a1) comparing parts of the current behavior expression with templates of the set of meanings associated with a current context;
(a2) for each meaning whose template matches the parts:
(a21) saving references to the parts in a working pool;
(a22) changing the current behavior expression to a new behavior expression including the definition cluster of the meaning; and
(a23) changing the current context to a new current context including a definition context identified by the meaning;
then
(b) invoking a logic component which is associated with the current context and which is identified by a data item in the second portion of the part found in step (a);
(c) executing the logic component and providing a discernible indication of the execution; and
(d) obtaining references to parts from the working pool, changing the current behavior expression to a new behavior expression including a cluster including the reference to parts; and
recursively performing steps (a)-(d) until one or more parts of the first cluster having third portions without references to parts are encountered in step (d).

8. The method of claim 7, wherein step (a) is recursively performed to accumulate a plurality of parts in the behavior expression which do not match a meaning template, further including executing steps (b) and (c) for each part of the plurality of parts and executing the second providing step for one or more parts of the plurality of parts following completion of step (a).

9. The method of claim 7, wherein in step (a) the parts form one or more candidate clusters in which each part of a candidate cluster of the one or more candidate clusters includes a reference to, or is referenced by, another part of the candidate cluster, step (a1) further including, for each candidate cluster of the one or more candidate clusters:
(a11) comparing the candidate cluster with the templates; and
(a12) detecting one or more meanings in the current context having templates matching the candidate cluster.

10. The method of claim 9, further including performing step (a2) for each meaning of the one or more meanings after all of the one or more meanings are found.

11. The method of claim 9, wherein step (a2) is performed for each meaning of said each one or more meanings when the meaning is detected.

12. A combination for executing functions of a control system in a computer complex, the combination including:
a plurality of parts, each part including a computer-addressable data object and having a first portion identifying the part, a second portion including a series of associated computer readable data items, and a third portion for referencing another part;
a plurality of clusters, each cluster including a data structure with one part or a plurality of interrelated parts, each part of the plurality of interrelated parts referencing or being referenced by another part of the plurality of interrelated parts;
a plurality of meanings, each meaning including:
a template having a part or a plurality of interrelated parts, each part of the plurality of interrelated parts referencing or being referenced by another part of the plurality of interrelated parts; and
a definition cluster;
a plurality of logic components, each logic component including an invocable computer-executable procedure;
a plurality of contexts, each context including an associated set of meanings and an associated set of logic components, and means for identifying a context as a definition context; and
means for:
designating a first context as a current context;
designating a first cluster as a current behavior expression;
comparing parts of the current behavior expression with templates of the set of meanings associated with the current context;
designating the definition cluster of a meaning of the st of meanings whose template matches parts of the current behavior expression as a new current behavior expression, and designating a definition context identified by the meaning as a new current context; and
invoking a logic component associated with the current context and identified by a data item in the second portion of any part in the current behavior expression which does not match a part in a meaning template.

13. A combination for executing functions of a control system, the combination comprising:
a computer system having a storage unit, a central processing unit, input means for providing input data to the storage unit and the central processing unit, and output means for providing discernable indications of actions performed by the central processing unit;
a plurality of parts stored in the storage unit, each part including a data object and having a first portion identifying the part, a second portion including a series of associated data items, and a third portion for referencing another part;
a plurality of clusters stored in the storage unit, each cluster including a data structure with one part or a plurality of interrelated parts, each part of the plurality of interrelated pads referencing or being referenced by another part of the plurality of interrelated parts;
a plurality of meanings stored in the storage unit, each meaning including:
a template having one part or a plurality of interrelated parts, each part of the plurality of interrelated parts referencing or being referenced by another part of the plurality of interrelated parts; and
a definition cluster;
a plurality of logic components, each logic component including an invocable procedure executable by a central processing unit;
a plurality of contexts, each context including an associated set of meanings and an associated set of logic components, and means for identifying a context as a definition context; and
means for:
designating a first context as a current context;

designating a first cluster as a current behavior expression;

comparing parts of the current behavior expression with templates of the set of meanings associated with the current context;

designating the definition cluster of a meaning of a set of meanings whose template matches parts of the current behavior expression as a new current behavior expression, and designating a definition context identified by the meaning as a new current context; and invoking a logic component associated with the current context and identified by a data item in the second portion of any part in the current behavior expression which does not match a part of a meaning template.

* * * * *